(12) United States Patent
Xu et al.

(10) Patent No.: US 9,025,112 B2
(45) Date of Patent: May 5, 2015

(54) DISPLAY WITH COLOR MIXING PREVENTION STRUCTURES

(75) Inventors: Ming Xu, Sunnyvale, CA (US); Shawn R. Gettemy, San Jose, CA (US); Young Cheol Yang, Sunnyvale, CA (US); Zhibing Ge, Sunnyvale, CA (US); Cheng Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 50 days.

(21) Appl. No.: 13/364,885

(22) Filed: Feb. 2, 2012

(65) Prior Publication Data

US 2013/0201429 A1    Aug. 8, 2013

(51) Int. Cl.
  *G02F 1/1335*    (2006.01)
  *G02F 1/1333*    (2006.01)
  *G02F 1/1362*    (2006.01)

(52) U.S. Cl.
  CPC .... *G02F 1/136209* (2013.01); *G02F 1/133512* (2013.01); *G02F 1/133514* (2013.01); *G02F 1/133526* (2013.01); *G02F 2001/133521* (2013.01); *G02F 2001/136222* (2013.01)

(58) Field of Classification Search
  CPC ............................................. G02F 2001/133607
  USPC .................................................. 349/106, 110
  See application file for complete search history.

(56) References Cited

U.S. PATENT DOCUMENTS

| | | | |
|---|---|---|---|
| 5,721,599 A * | 2/1998 | Cheng ............................ | 349/106 |
| 5,742,365 A | 4/1998 | Seo | |
| 6,195,140 B1 * | 2/2001 | Kubo et al. ..................... | 349/44 |
| 6,429,916 B1 * | 8/2002 | Nakata et al. ................. | 349/106 |
| 6,567,139 B2 * | 5/2003 | Huang ........................... | 349/110 |
| 6,774,963 B1 | 8/2004 | Nakao et al. | |
| 6,872,586 B2 * | 3/2005 | Kiguchi et al. ................. | 438/28 |
| 7,245,335 B2 * | 7/2007 | Watanabe ........................ | 349/64 |
| 7,259,811 B2 * | 8/2007 | Kim ................................. | 349/106 |
| 7,394,510 B2 * | 7/2008 | Oh et al. ......................... | 349/106 |
| 7,561,231 B2 | 7/2009 | Kanbe et al. | |
| 7,742,129 B2 * | 6/2010 | Li et al. .......................... | 349/106 |
| 2004/0021809 A1 * | 2/2004 | Sumiyoshi et al. ............ | 349/113 |
| 2006/0232529 A1 | 10/2006 | Midorikawa | |
| 2006/0250546 A1 * | 11/2006 | Miyao et al. .................... | 349/95 |
| 2007/0182889 A1 | 8/2007 | Togashi | |
| 2009/0086352 A1 | 4/2009 | Tsao et al. | |
| 2010/0149116 A1 * | 6/2010 | Yang et al. ..................... | 345/173 |
| 2010/0182549 A1 * | 7/2010 | Miyashita ...................... | 349/106 |
| 2011/0080357 A1 | 4/2011 | Park et al. | |
| 2011/0267560 A1 * | 11/2011 | Usukura ......................... | 349/62 |

FOREIGN PATENT DOCUMENTS

| | | |
|---|---|---|
| EP | 1852732 | 11/2007 |
| JP | 2001 033768 | 2/2001 |

* cited by examiner

*Primary Examiner* — Wen-Ying P Chen
(74) *Attorney, Agent, or Firm* — Treyz Law Group; Kendall P. Woodruff

(57) ABSTRACT

An electronic device may have a liquid crystal display having a backlight and color mixing prevention structures. The color mixing prevention structures may, in part, be formed from one or more arrays of color filter elements. The liquid crystal display may include first and second transparent substrate layers on opposing sides of a liquid crystal layer. The display may include a first array of color filter elements on the first transparent substrate layer and a second array of color filter elements on the second transparent substrate layer. One or more of the arrays of color filter elements may include a black matrix formed over portions of the color filter elements. The color filter elements may fill or partially fill openings in the black matrix. The display may include a collimating layer on the second transparent substrate layer. The color filter elements may include cholesteric color filter elements.

9 Claims, 23 Drawing Sheets

DISPLAY WITH COLOR MIXING PREVENTION STRUCTURES

BACKGROUND

This relates generally to electronic devices and, more particularly, to displays for electronic devices.

Electronic devices such as computers and cellular telephones are generally provided with displays. Displays such as liquid crystal displays contain a thin layer of liquid crystal material. Color liquid crystal displays include color filter layers. The layer of liquid crystal material in this type of display is interposed between the color filter layer and a thin-film transistor. Polarizer layers may be placed above and below the color filter layer, liquid crystal material, and thin-film transistor layer.

When it is desired to display an image for a user, display driver circuitry applies signals to a grid of data lines and gate lines within the thin-film transistor layer. These signals adjust electric fields associated with an array of pixels on the thin-film transistor layer. The electric field pattern that is produced controls the liquid crystal material and creates a visible image on the display.

Image quality in conventional displays can be degraded during off-axis viewing, because off-axis viewing angles can allow light from display pixels of one color to bleed into adjacent display pixels of another color. Although off-axis quality can be improved somewhat by incorporating wide black matrix structures into the display, the use of excessively wide black matrix masking lines can adversely affect display brightness and may be impractical for use in a high-resolution display in which increasingly narrow black matrix masking lines are desired.

It would therefore be desirable to be able to provide improved electronic device displays.

SUMMARY

Electronic devices may be provided with displays such as liquid crystal displays. A display may have an array of display pixels. A liquid crystal display may be provided with backlight structures. The backlight structures may produce backlight that passes through the array of display pixels. The display pixels may include electrode structures and thin-film transistor structures for controlling electric fields in a layer of liquid crystal material. The liquid crystal material may be formed between an outer display layer formed in part by a first transparent substrate and an inner display layer formed, in part, by a second transparent substrate.

The inner display layer may be interposed between the backlight structures and the liquid crystal material. Thin-film transistor structures, electrodes, and conductive interconnection lines may be deposited in a layer on the inner surface of the inner display layer. In one suitable configuration, the first transparent substrate may form a layer of cover glass for the display.

A layer of color filter elements may be used to provide the display with color pixels. Color filter elements may be formed on the thin-film transistor layer. Color filter elements may be formed on the outer display layer. In some configurations, color filter elements may be formed on both the thin-film transistor layer and the outer display layer.

A patterned layer of opaque masking material may be formed in a peripheral border region of the outer display layer. A portion of the opaque masking material may form black matrix mask that visually separates adjacent color filter elements. A planarization layer may be used to cover some, or all, of the opaque masking layer. If desired, the planarization layer may be interposed between the black matrix and the color filter elements.

A first black matrix on the outer display layer may include openings for color filter elements on the outer display layer and a second black matrix on the inner display layer may include openings for the color filter elements one the thin-film transistor layer. The black matrix openings may be completely or partially filled with the color filter elements.

If desired, some or all of the interconnect lines of the thin-film transistor layer may be embedded within a black matrix that is formed on the thin-film transistor layer.

If desired, some or all of the color filter elements may be formed using cholesteric filter material such as a multilayer dielectric stack that includes materials with different indices of refraction configured to form an optical filter.

If desired, a light collimating layer may be provided on the second transparent substrate layer. The light collimating layer may be formed from collimating structures such as Fresnel lens structures, microlens structures, or structures containing an array of microprisms.

If desired, a portion of the array of color filter elements may be interposed between the black matrix and an inner surface of a transparent substrate layer. The portion of the color filter elements may be interposed between first regions of the black matrix and the inner surface while second regions of the black matrix are formed on the inner surface without any interposed color filter elements.

If desired, the array of color filter elements may form a contiguous array of color filter elements of different colors having adjoining edges. The black matrix may cover the adjoining edges without touching the inner surface of the transparent substrate layer.

Further features of the invention, its nature and various advantages will be more apparent from the accompanying drawings and the following detailed description of the preferred embodiments.

DETAILED DESCRIPTION

Figure 1:
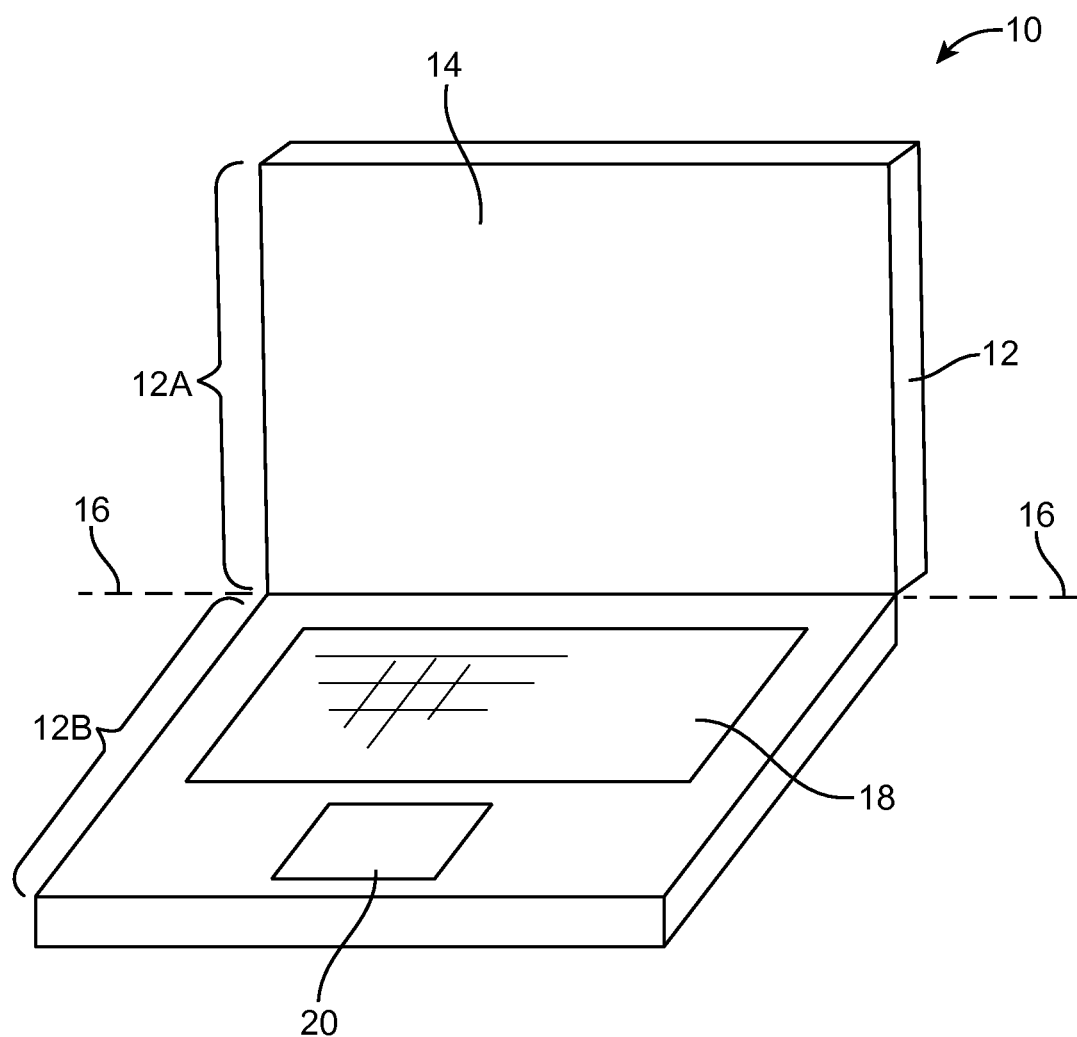
FIG. 1 is a diagram of an illustrative electronic device with a display such as a portable computer in accordance with an embodiment of the present invention.

An illustrative electronic device of the type that may be provided with a display is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a display such as display 14. Display 14 may be a touch screen that incorporates capacitive touch electrodes or other touch sensor components or may be a display that is not touch sensitive. Display 14 may include image pixels formed from liquid crystal display (LCD) components or other suitable display pixel structures. Arrangements in which display 14 is formed using liquid crystal display pixels are sometimes described herein as an example. This is, however, merely illustrative. Any suitable type of display technology may be used in forming display 14 if desired.

Device 10 may have a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

As shown in FIG. 1, housing 12 may have multiple parts. For example, housing 12 may have upper portion 12A and lower portion 12B. Upper portion 12A may be coupled to lower portion 12B using a hinge that allows portion 12A to rotate about rotational axis 16 relative to portion 12B. A keyboard such as keyboard 18 and a touch pad such as touch pad 20 may be mounted in housing portion 12B.

Figure 2:
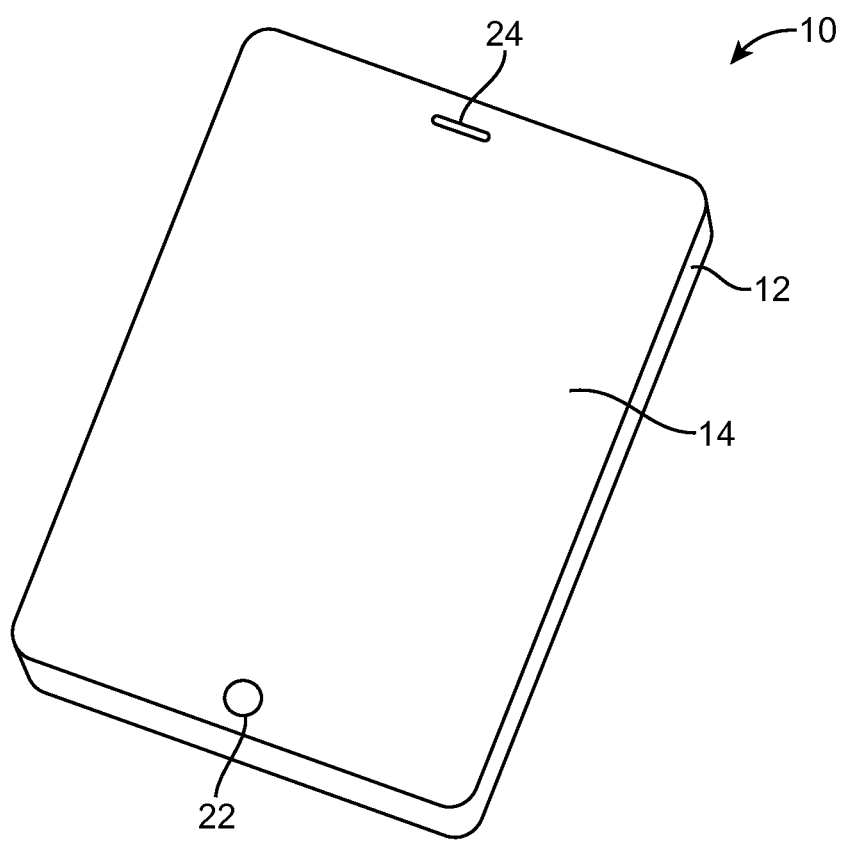
FIG. 2 is a diagram of an illustrative electronic device with a display such as a cellular telephone or other handheld device in accordance with an embodiment of the present invention.

In the example of FIG. 2, device 10 has been implemented using a housing that is sufficiently small to fit within a user's hand (i.e., device 10 of FIG. 2 may be a handheld electronic device such as a cellular telephone). As show in FIG. 2, device 10 may include a display such as display 14 mounted on the front of housing 12. Display 14 may be substantially filled with active display pixels or may have an active portion and an inactive portion. Display 14 may have openings (e.g., openings in the inactive or active portions of display 14) such as an opening to accommodate button 22 and an opening to accommodate speaker port 24.

Figure 3:
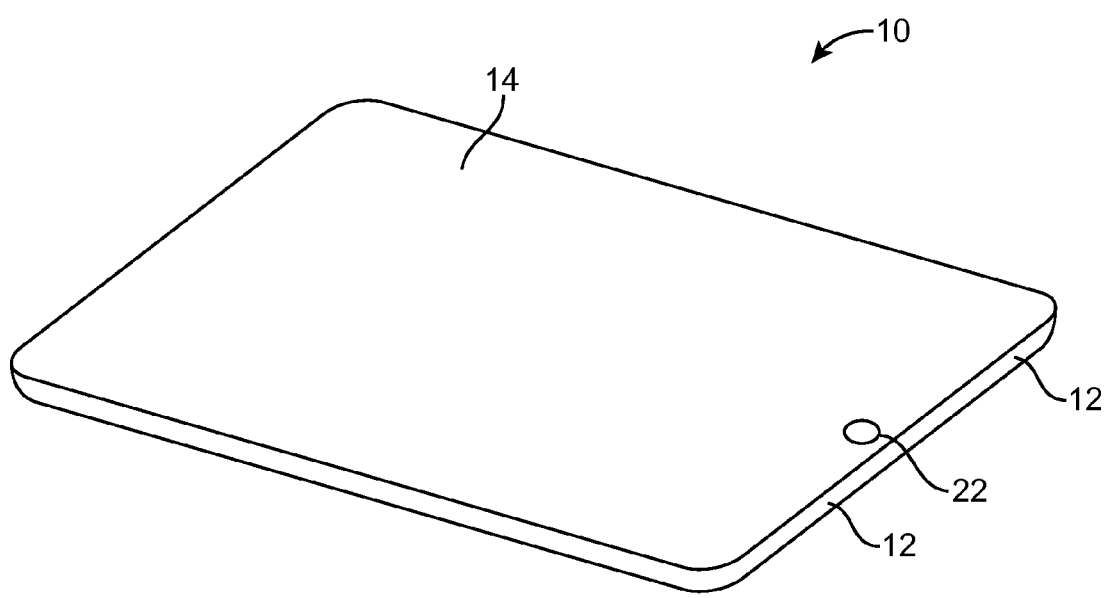
FIG. 3 is a diagram of an illustrative electronic device with a display such as a tablet computer in accordance with an embodiment of the present invention.

FIG. 3 is a perspective view of electronic device 10 in a configuration in which electronic device 10 has been implemented in the form of a tablet computer. As shown in FIG. 3, display 14 may be mounted on the upper (front) surface of housing 12. An opening may be formed in display 14 to accommodate button 22.

Figure 4:
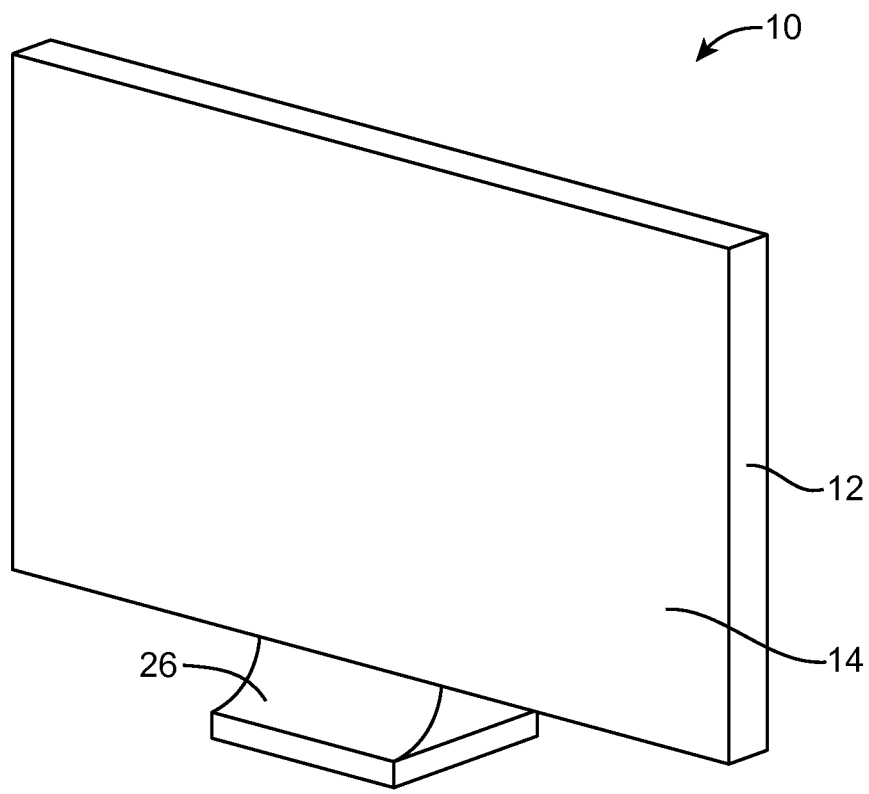
FIG. 4 is a diagram of an illustrative electronic device with a display such as a computer monitor with a built-in computer in accordance with an embodiment of the present invention.

FIG. 4 is a perspective view of electronic device 10 in a configuration in which electronic device 10 has been implemented in the form of a computer integrated into a computer monitor. As shown in FIG. 4, display 14 may be mounted on the front surface of housing 12. Stand 26 may be used to support housing 12.

Other configurations may be used for electronic device 10 if desired. The examples of FIGS. 1, 2, 3, and 4 are merely illustrative.

Figure 5:
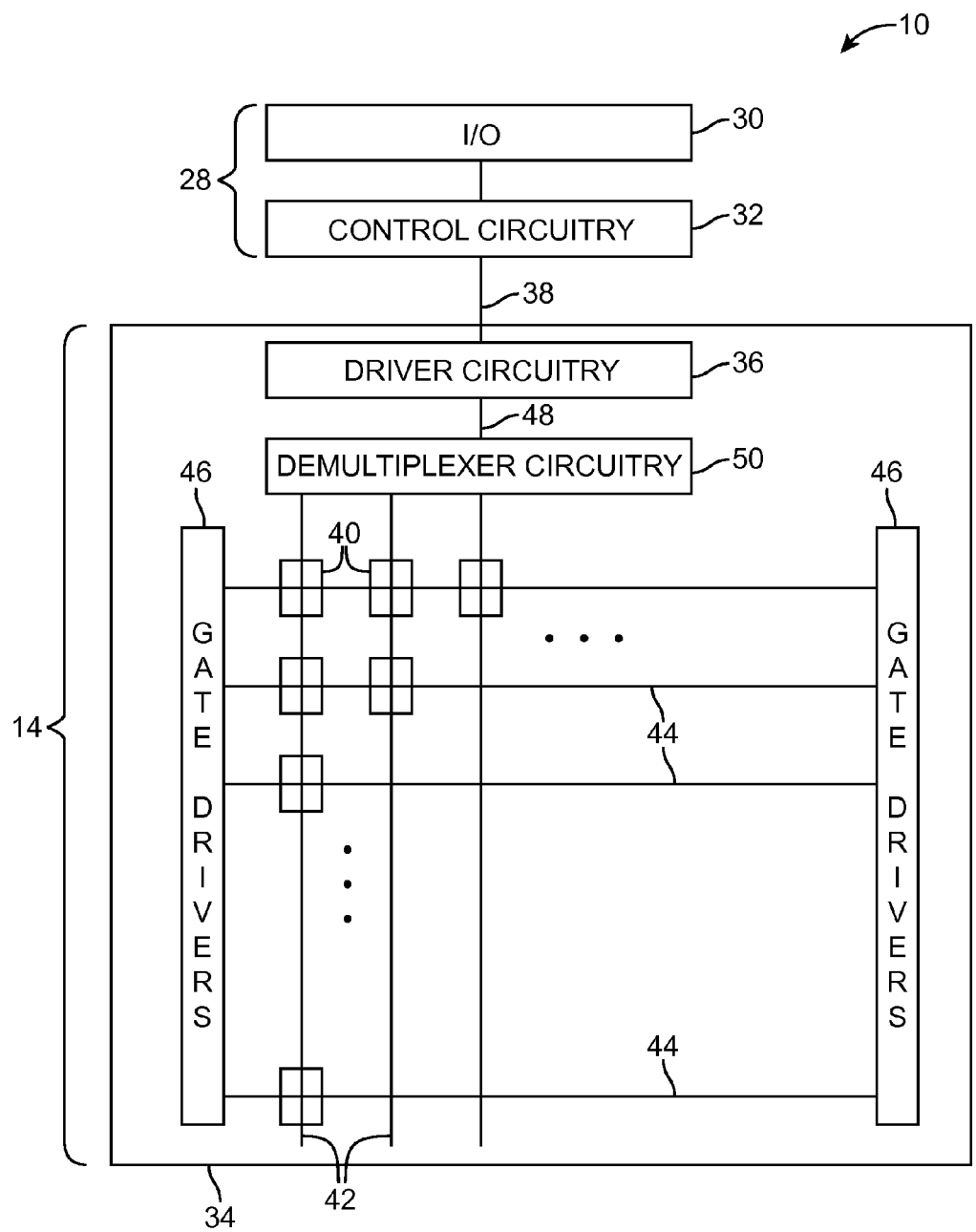
FIG. 5 is a circuit diagram showing circuitry that may be used in operating an electronic device with a display in accordance with an embodiment of the present invention.

A diagram showing circuitry of the type that may be used in device 10 is shown in FIG. 5. As shown in FIG. 5, display 14 may be coupled to device components 28 such as input-output circuitry 30 and control circuitry 32. Input-output circuitry 30 may include components for receiving device input. For example, input-output circuitry 30 may include a microphone for receiving audio input, a keyboard, keypad, or other buttons or switches for receiving input (e.g., key press input or button press input from a user), sensors for gathering input such as an accelerometer, a compass, a light sensor, a proximity sensor, touch sensor (e.g., touch sensors associated with display 14 or separate touch sensors), or other input devices. Input-output circuitry 30 may also include components for supplying output.

Output circuitry may include components such as speakers, light-emitting diodes or other light-emitting devices for producing light output, vibrators, and other components for supplying output. Input-output ports in circuitry 30 may be used for receiving analog and/or digital input signal and may be used for outputting analog and/or digital output signals. Examples of input-output ports that may be used in circuitry 30 include audio ports, digital data ports, ports associated with 30-pin connectors, and ports associated with Universal Serial Bus connectors and other digital data connectors.

Control circuitry 32 may be used in controlling the operation of device 10. Control circuitry 32 may include storage circuits such as volatile and non-volatile memory circuits, solid state drives, hard drives, and other memory and storage circuitry. Control circuitry 32 may also include processing circuitry such as processing circuitry in a microprocessor or other processor. One or more integrated circuits may be used in implementing control circuitry 32. Examples of integrated circuits that may be included in control circuitry 32 include microprocessors, digital signal processors, power management units, baseband processors, microcontrollers, application-specific integrated circuits, circuits for handling audio and/or visual information, and other control circuitry.

Control circuitry 32 may be used in running software for device 10. For example, control circuitry 32 may be configured to execute code in connection with the displaying of images on display 14 (e.g., text, pictures, video, etc.).

Display 14 may include a pixel array such as pixel array 34. Pixel array 34 may be controlled using control signals produced by display driver circuitry such as display driver circuitry 36. Display driver circuitry 36 may be implemented using one or more integrated circuits (ICs) and may sometimes be referred to as a driver IC, display driver integrated circuit, or display driver. Display driver integrated circuit 36 may be mounted on an edge of a thin-film transistor substrate layer in display 14 (as an example). The thin-film transistor substrate layer may sometimes be referred to as a thin-film transistor (TFT) layer.

During operation of device 10, control circuitry 32 may provide data to display driver 36. For example, control circuitry 32 may use a path such as path 38 to supply display driver 36 with digital data corresponding to text, graphics, video, or other images to be displayed on display 14. Display driver 36 may convert the data that is received on path 38 into signals for controlling the pixels of pixel array 34.

Pixel array 34 may contain rows and columns of display pixels 40. The circuitry of pixel array 34 may be controlled using signals such as data line signals on data lines 42 and gate line signals on gate lines 44.

Pixels 40 in pixel array 34 may contain thin-film transistor circuitry (e.g., polysilicon transistor circuitry or amorphous silicon transistor circuitry) and associated structures for producing electric fields across liquid crystal material in display 14. The thin-film transistor structures that are used in forming pixels 40 may be located on a substrate (sometimes referred to as a thin-film transistor layer or thin-film transistor substrate). The thin-film transistor (TFT) layer may be formed from a planar glass substrate, a plastic substrate, or a sheet of other suitable substrate materials.

Gate driver circuitry 46 may be used to generate gate signals on gate lines 44. Circuits such as gate driver circuitry 46 may be formed from thin-film transistors on the thin-film transistor layer. Gate driver circuitry 46 may be located on both the left and right sides of pixel array 34 (as shown in FIG. 5) or may be located on only one side of pixel array 34.

The data line signals in pixel array 34 carry analog image data (e.g., voltages with magnitudes representing pixel brightness levels). During the process of displaying images on display 14, display driver integrated circuit 36 may receive digital data from control circuitry 32 via path 38 and may produce corresponding analog data on path 48. The analog data signals on path 48 may be demultiplexed by demultiplexer circuitry 50 in accordance with control signals provided by driver circuitry 36. This demultiplexing process produces corresponding color-coded analog data line signals on data lines 42 (e.g., data signals for a red channel, data signals for a green channel, and data signals for a blue channel).

The data line signals on data lines 42 may be provided to the columns of display pixels 40 in pixel array 34. Gate line signals may be provided to the rows of pixels 40 in pixel array 34 by gate driver circuitry 46.

The circuitry of display 14 such as demultiplexer circuitry 50 and gate driver circuitry 46 and the circuitry of pixels 40 may be formed from conductive structures (e.g., metal lines and/or structures formed from transparent conductive materials such as indium tin oxide) and may include transistors that are fabricated on the thin-film transistor substrate layer of display 14. The thin-film transistors may be, for example, polysilicon thin-film transistors or amorphous silicon transistors.

Figure 6:
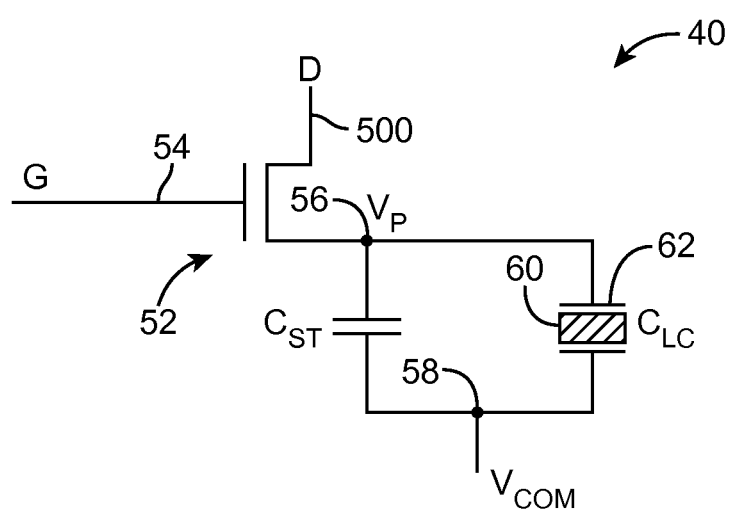
FIG. 6 is a circuit diagram of an illustrative display pixel in accordance with an embodiment of the present invention.

FIG. 6 is a circuit diagram of an illustrative display pixel in pixel array 34. Pixels such as pixel 40 of FIG. 6 may be located at the intersection of each gate line 44 and data line 42 in array 34.

A data signal D may be supplied to terminal 500 from one of data lines 42 (FIG. 5). Thin-film transistor 52 (e.g., a thin-film polysilicon transistor or an amorphous silicon transistor) may have a gate terminal such as gate 54 that receives gate line signal G from gate driver circuitry 46 (FIG. 5). When signal G is asserted, transistor 52 will be turned on and signal D will be passed to node 56 as voltage Vp. Data for display 14 may be displayed in frames. Following assertion of signal G in one frame, signal G may be deasserted. Signal G may then be asserted to turn on transistor 52 and capture a new value of Vp in a subsequent display frame.

Pixel 40 may have a signal storage element such as capacitor Cst or other charge storage element. Storage capacitor Cst may be used to store signal Vp between frames (i.e., in the period of time between the assertion of successive signals G).

Display 14 may have a common electrode coupled to node 58. The common electrode (which is sometimes referred to as the Vcom electrode) may be used to distribute a common electrode voltage such as common electrode voltage Vcom to nodes such as node 58 in each pixel 40 of array 24. Capacitor Cst may be coupled between nodes 56 and 58. A parallel capacitance Clc arises across nodes 56 and 58 due to electrode structures in pixel 40 that are used in controlling the electric field through the liquid crystal material of the pixel (liquid crystal material 60). As shown in FIG. 6, electrode structures 62 may be coupled to node 56. Capacitance Clc is associated with the capacitance between electrode structures 62 and common electrode Vcom at node 58. During operation, electrode structures 62 may be used to apply a controlled electric field (i.e., a field having a magnitude proportional to Vp-Vcom) across a pixel-sized portion of liquid crystal material 60 in pixel 40. Due to the presence of storage capacitor Cst, the value of Vp (and therefore the associated electric field across liquid crystal material 60) may be maintained across nodes 56 and 58 for the duration of the frame.

The electric field that is produced across liquid crystal material 60 causes a change in the orientations of the liquid crystals in liquid crystal material 60. This changes the polarization of light passing through liquid crystal material 60. The change in polarization may be used in controlling the amount of light that is transmitted through each pixel 40 in array 34.

Figure 7:
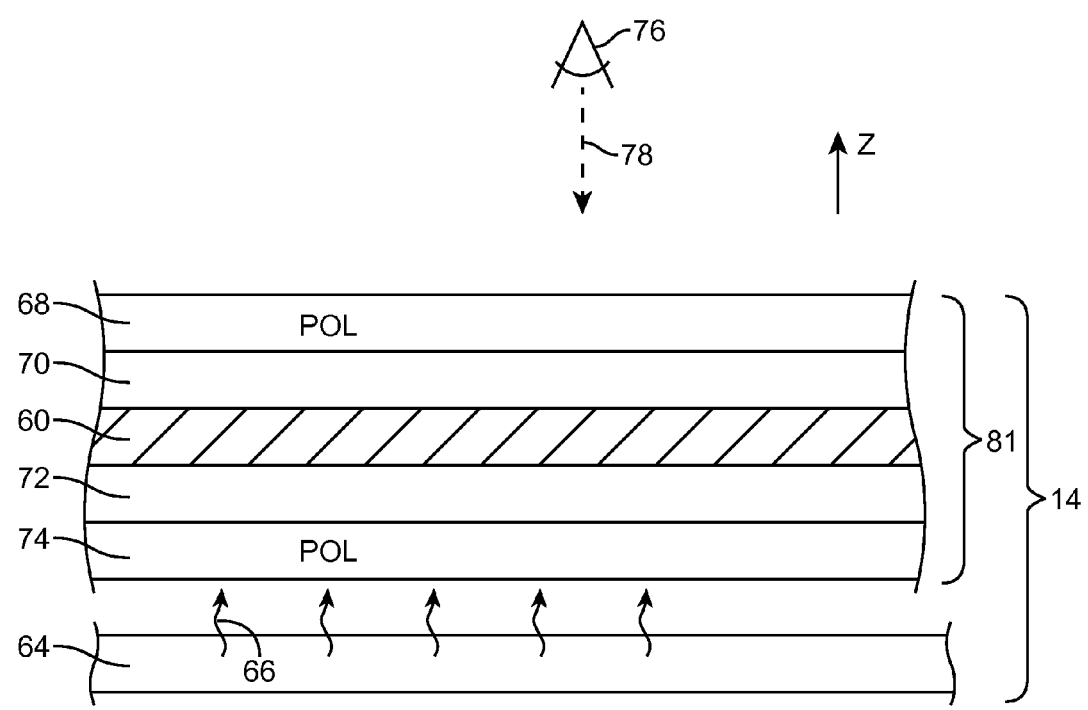
FIG. 7 is a cross-sectional side view of a portion of an illustrative liquid crystal display with backlight structures in accordance with an embodiment of the present invention.

A portion of display 14 illustrating how changes in the light polarization produced by liquid crystal material 60 can be used to affect the amount of light that is transmitted through display 14 is shown in FIG. 7. As shown in FIG. 7, backlight structures 64 may be used to produce backlight 66 that travels upwards (outwards) in dimension Z through display layers 81 of display 14. Display layers 81 may include an upper polarizer layer such as layer 68 and a lower polarizer layer 74. Upper polarizer layer 68 may be attached to one or more substrate layers such as layer 70. Lower polarizer layer 74 may be attached to one or more substrate layers such as layer 72. Layers 70 and/or 72 may be formed from transparent layers such as layers of glass, plastic, or other sheets of material. Layers 70 and/or 72 and other layers of display 81 may include thin-film transistor layers, color filter layers, layers that include thin-film transistor structures and color filter elements, planarization layers, opaque masking patterns, clear layers, or other suitable display layers.

As light 66 passes through lower polarizer 74, lower polarizer 74 polarizes light 66. As polarized light 66 passes through liquid crystal material 60, liquid crystal material 60 may rotate the polarization of light 66 by an amount that is proportional to the electric field through liquid crystal material 60. If the polarization of light 66 is aligned in parallel with the polarization of polarizer 68, the transmission of light 66 through layer 68 will be maximized. If the polarization of light 66 is aligned so as to run perpendicular to the polarization of polarizer 68, the transmission of light 66 through layer 68 will be minimized (i.e., light 66 will be blocked). The display circuitry of FIG. 5 may be used in adjusting the voltages Vp across the electrodes 62 of display pixels 40 in display pixel array 34, thereby selectively lightening and darkening pixels 40 in pixel array 34 and presenting an image to a user of device 10 such as viewer 76, viewing display 14 in direction 78.

Displays such as display 14 may be mounted on one or more surfaces of device 10. For example, displays such as display 14 may be mounted on a front face of housing 12, on a rear face of housing 12, or on other portions of device 10.

Figure 8:
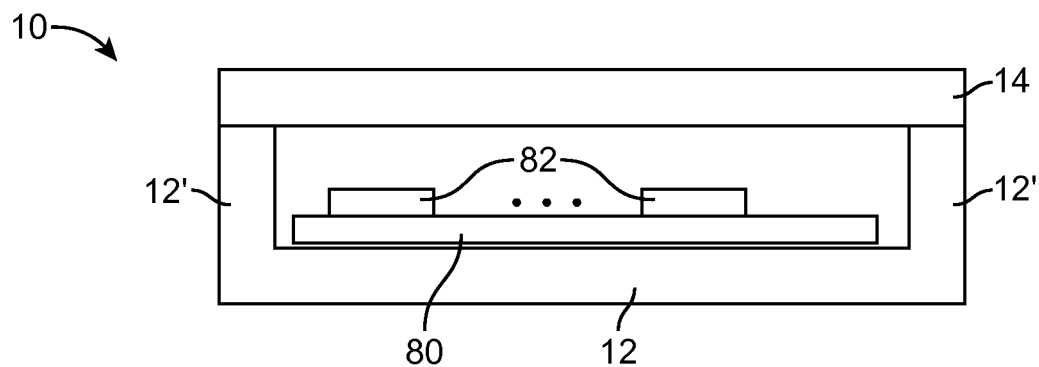
FIG. 8 is a cross-sectional view of an illustrative electronic device having a display that overlaps housing sidewall structures in accordance with an embodiment of the present invention.

As shown in FIG. 8, display 14 may be mounted in housing 12 so that some or all of the edges of display 14 overlap housing sidewalls 12'. Internal electrical components 82 (e.g., input-output components 30, control circuitry 32, etc.) may be mounted on one or more substrates such as substrate 80 within housing 12. Substrate 80 may be formed from one or more printed circuits. For example, substrate 80 may include a rigid printed circuit board (e.g., a printed circuit board formed from a material such as fiberglass-filled epoxy) and/or a flexible printed circuit ("flex circuit") such as a printed circuit formed from patterned conductive traces on a sheet of polyimide or other flexible polymer.

Figure 9:
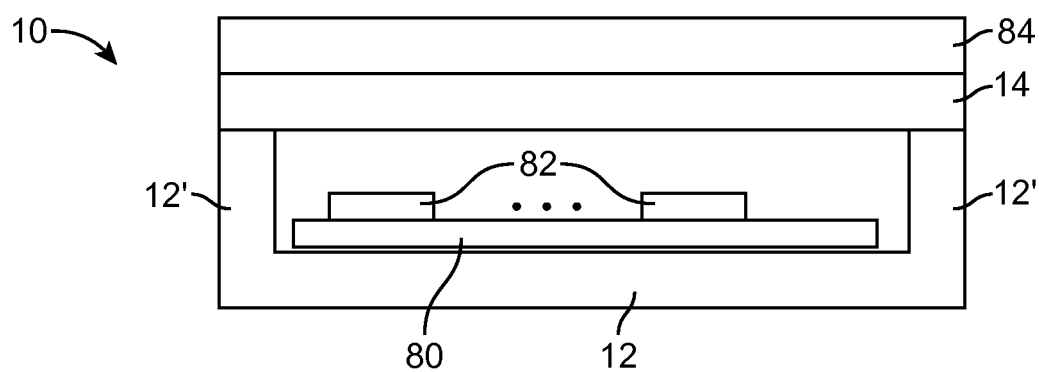
FIG. 9 is a cross-sectional view of an illustrative electronic device having a display that overlaps housing sidewall structures and having a display cover layer in accordance with an embodiment of the present invention.

If desired, some or all of the outermost surface of display 14 may be covered with a display cover layer such as display cover layer 84 of FIG. 9. Display cover layer 84 may be formed from a layer of glass, a layer of plastic, a layer of ceramic, or other suitable transparent materials. One or more additional display layers may also be included in display 14 if desired (e.g., antireflection films, scratch-resistance coating layers, fingerprint-reducing layers, layers that perform multiple functions such as reducing reflection, reducing scratches, and reducing fingerprints, etc.).

Figure 10:
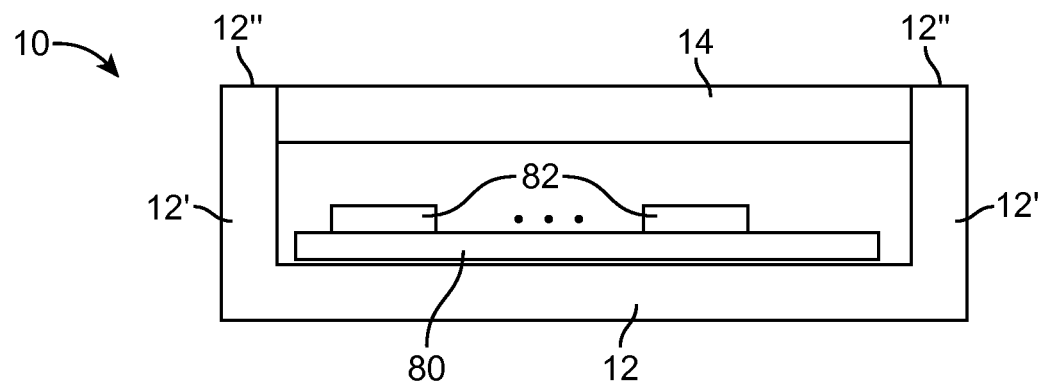
FIG. 10 is a cross-sectional view of an illustrative electronic device having a display with edges that are mounted between opposing housing sidewalls in accordance with an embodiment of the present invention.
Figure 11:
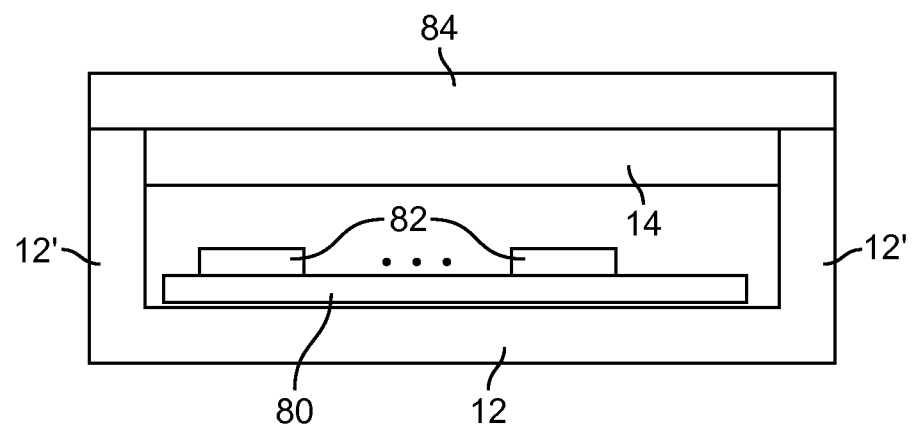
FIG. 11 is a cross-sectional view of an illustrative electronic device having a display with edges that are mounted between opposing housing sidewalls and having a display cover layer in accordance with an embodiment of the present invention.

FIG. 10 is a cross-sectional view of device 10 in a configuration in which display 14 has been mounted between respective housing sidewalls 12' (i.e., without overlapping upper edges 12" of sidewalls 12'). FIG. 11 shows how display cover layer 84 may be used to cover display 14 in a configuration in which display 14 is mounted between housing sidewalls 12'.

The illustrative mounting arrangements of FIGS. 8, 9, 10, and 11 are merely illustrative examples of ways in which display 14 may be mounted in housing 12 of device 10. Other mounting configurations may be used if desired.

Figure 12:
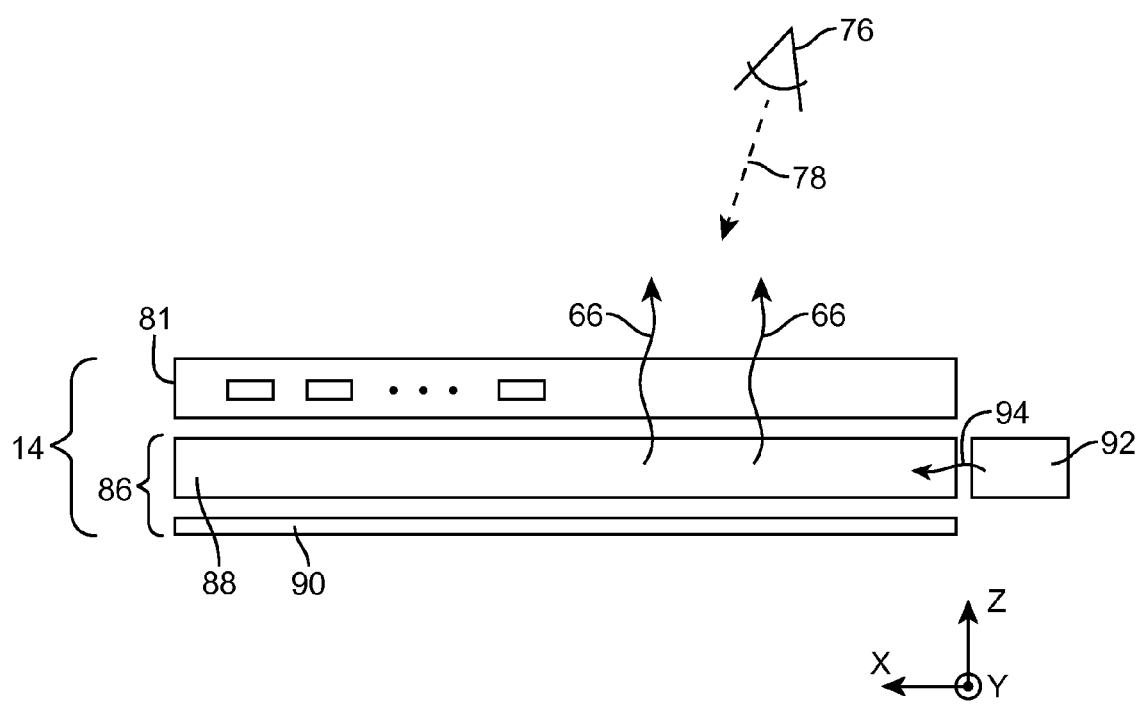
FIG. 12 is a cross-sectional side view of a display showing how backlight structures may be used to provide the display with backlight in accordance with an embodiment of the present invention.

FIG. 12 is a cross-sectional view of display 14 showing how backlight structures 86 may be used in producing backlight 66 for display 14. As shown in FIG. 12, a light source such as light source 92 may produce light 94. Light source 92 may include, for example, one or more light-emitting diodes. Backlight structures 86 may include a light guide plate and other layers 88 (e.g., a diffuser and other optical films). A reflective layer such as reflector 90 may be placed on the rear surface of the light guide plate. As light 94 travels through the light guide plate, some of light 94 scatters upwards in direction Z towards viewer 76 and serves as backlight 66 for display 14. Light that scatters downwards may be reflected upwards by reflector 90 to serve as additional backlight 66.

Display layers 81 may include thin-film transistors such as transistor 52 of FIG. 6 and conductive structures (e.g., electrodes such as electrode 62, gate lines, data lines, and other lines and conductive structures formed from metal and/or indium tin oxide or other transparent conductive materials). Display layers 81 may also include color filter structures for imparting colors such as red, blue, and green colors to pixels 40 in pixel array 34. The color filter structures may be formed in an array (e.g., an array of alternating red, green, and blue color filter elements) and are therefore sometimes referred to as a color filter array or color filter array structures.

Color filter array structures may be formed using colored substances such as dye or pigment (e.g., colored red, blue, and green ink or materials of other suitable colors). Color filter structures may be formed by ink-jet printing, screen printing, pad printing, photolithographic patterning, or other suitable deposition and patterning techniques. Color filter structures may be formed on the same substrate as the thin-film transistors and conductive structures of display pixels 40 or may be formed separately (e.g., on a transparent substrate that is separated from a thin-film transistor substrate layer).

Figure 13:
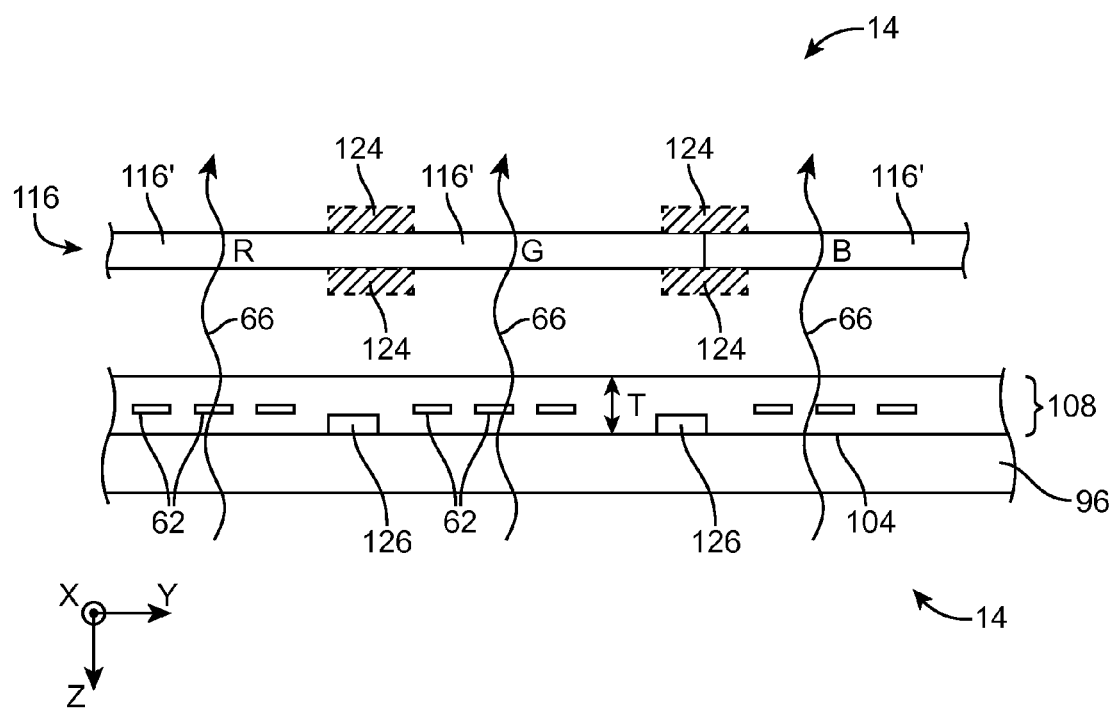
FIG. 13 is a cross-sectional view of an illustrative display having a substrate layer on which thin-film transistor structures have been formed in accordance with an embodiment of the present invention.

As shown in FIG. 13, thin-film transistor layer 108 may be formed on substrate 96. Each electrode 62 (i.e., each set of three common electrode finger structures in the example of FIG. 13) may be configured generate electric fields in liquid crystal material associated with a given pixel 40. If desired, color filter elements 116' of color filter layer 116 may be used to impart colors to backlight 66 generated by backlight structures 86 (FIG. 12). Color filter layer 116 may include lines of black matrix material 124.

Black matrix material 124 may be formed on one or more surfaces of color filter array 116 and may be configured to overlap structures in thin-film transistor layer 108 such as structures 126 (e.g., gate lines 44, data lines 42, etc.) and thereby block structures 126 from view. The thickness T of thin-film transistor layer 108 may be relatively small (e.g., less than 25 microns, less than 5 microns, less than 2 microns, etc.). One or more color filter layers 116 may be provided. If desired, a color filter array such as color filter array 116 may be formed on thin-film transistor layer 108. If desired, a layer of liquid crystal material such as liquid crystal layer 60 may be formed between color filter array 116 and thin-film transistor layer 108.

Figure 14:
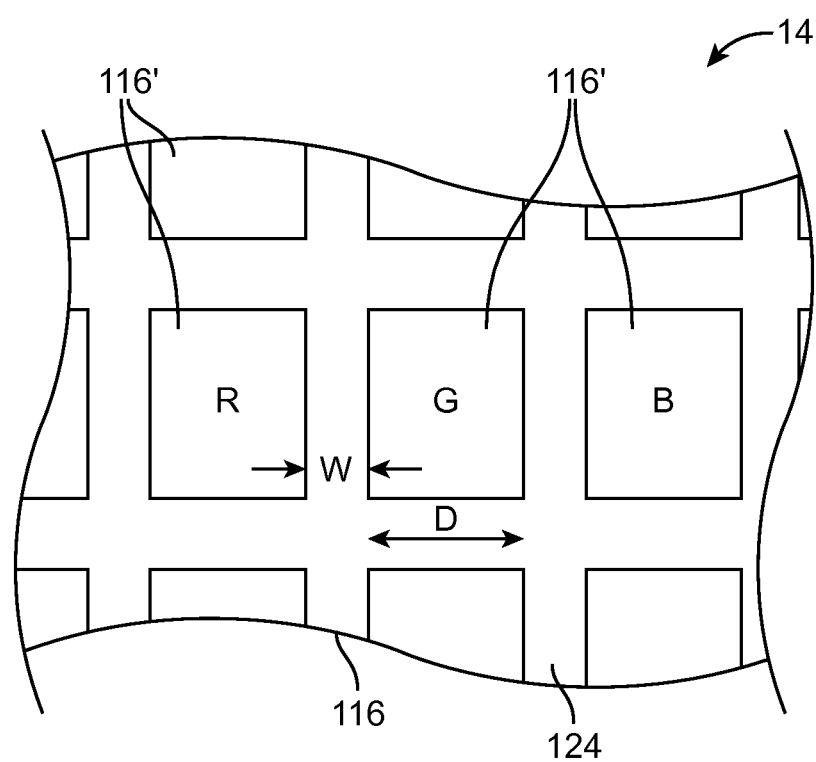
FIG. 14 is a top view of a portion of a display showing how a black matrix may be used to visually separate color filter elements in accordance with an embodiment of the present invention.

As shown in FIG. 14, color filter elements 116' in color filter array 116 may be separated by lines of opaque material (sometimes referred to as black matrix material or opaque masking material). The black matrix may be used to block metal lines and other structures from view by the user of device 10 and may help reduce light leakage between adjacent pixels. The black matrix may be formed from opaque organic or inorganic materials such as chrome and black ink (as examples).

The top view of color filter array 116 in FIG. 14 shows how black matrix 124 may form a grid of opaque masking lines on color filter layer 116 that visually separate respective color filter elements 116'. The width of the masking lines (shown as width W in FIG. 15) may be less than 50 microns, less than 30 microns, less than 20 microns, less than 15 microns, less than 10 microns, less than 7 microns, less than 3 microns, or any other suitable width. The lateral dimensions of color filter elements 116' may be 500 microns or less, 100 microns or less, 50 microns or less, or microns or less (as examples). For example, rectangular color filter elements 116' in array 116 may be provided with pixel dimensions of 25 microns by 75 microns (as an example).

Figure 15:
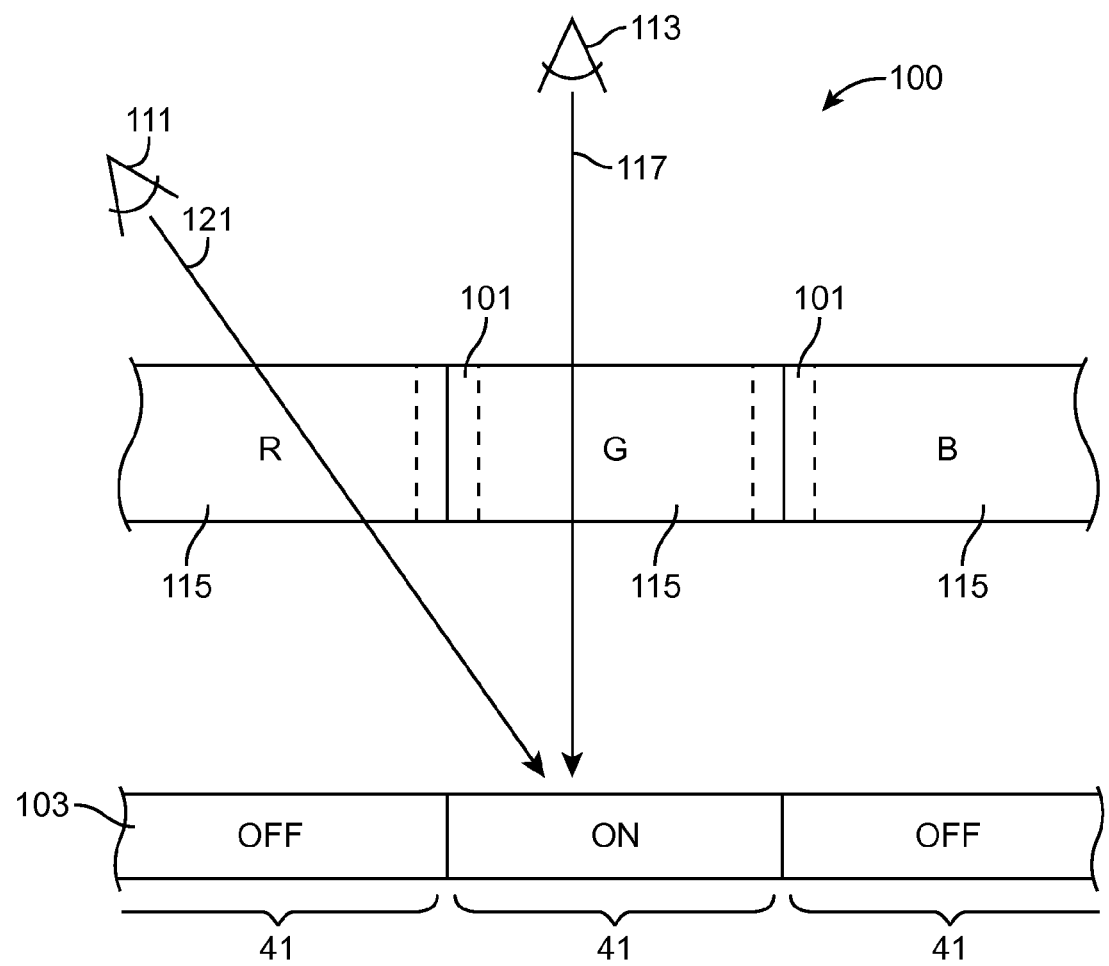
FIG. 15 is a cross-sectional side view of a conventional color filter array showing how color mixing may be present at off-axis viewing angles.

It may be desirable to reduce the magnitude of black matrix line width W relative to the lateral dimensions D of color filter elements 116' to improve display brightness (i.e., brightness efficiency). However, as shown in FIG. 15, a conventional display 100 having separators 101 between color filters 115 may provide a line of sight to an operating light source through a color filter associated with a non-operating light source. Conventional display 100 includes an array 103 of light sources associated with pixels 41 that are aligned with color filters 115.

While the light source associated with the green filter (g) is operating (ON), the light sources associated with the red filter (r) and the blue filter (b) are not operating (OFF). A viewer 113 viewing conventional display 100 along on-axis viewing angle 117 views the operating light source through the desired filter g. However, a viewer 111 viewing conventional display 100 along an off-axis viewing angle 121 will see the operating light source through the incorrect (r) filter, thereby reducing the quality of the content displayed using conventional display 100.

Figure 16:
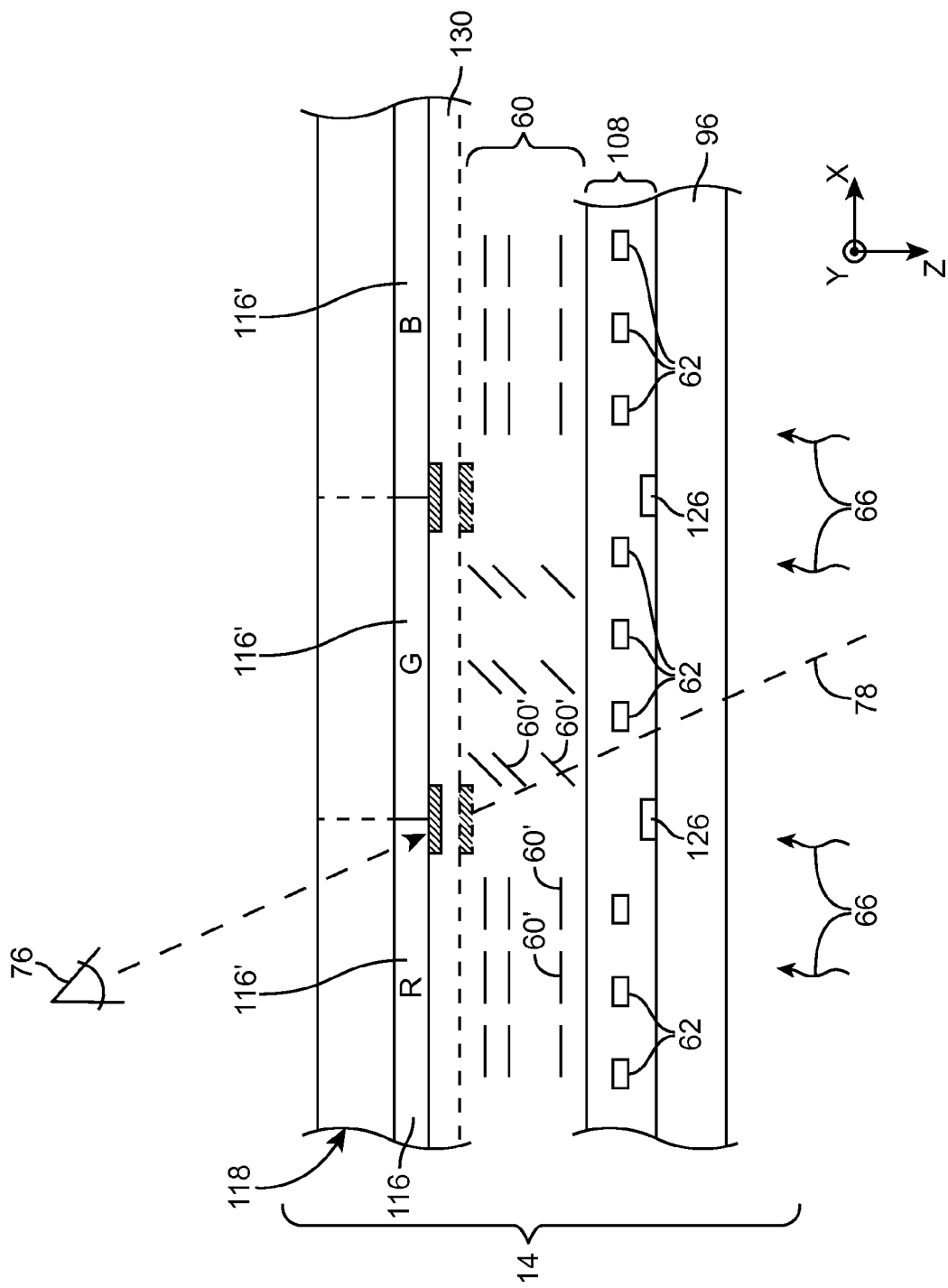
FIG. 16 is a cross-sectional side view of a portion of an illustrative display showing how formation of a black matrix layer over an array of color filter elements on an outer display layer may help improve off-axis display performance in accordance with an embodiment of the present invention.

In order to prevent this type of color mixing display content degradation, device 10 may be provided with color mixing prevention structures. Consider, as an example, display 14 of FIG. 16. As shown in FIG. 16, color filter layer 116 may be provided color mixing prevention structures such as black matrix material 124 that is formed at least partially on an interior surface of color filter elements 116' of color filter array 116 on outer display layer 118.

Color filter array (color filter layer) 116 may be formed on an inner surface (e.g., a surface that faces liquid crystal layer 60) of transparent substrate layer 118. Color filter layer 116 may include an array of color filter elements 116' and a black matrix 124 having openings 142 for color filter elements 116'. As shown in FIG. 16, a portion of array 116 of color filter elements 116' may be interposed between black matrix 124 and the inner surface of layer 118. If desired, a transparent planarization layer such as planarization layer 130 may be interposed between black matrix material 124 and color filter elements 116'.

Viewer 76 may view display 14 through substrate 118 and color filter layer 116 by viewing in a direction such as direction 78. (Polarizer layers, cover glass, backlight structures and other layers have been omitted from FIG. 16 for clarity). Backlight 66 passes through liquid crystal material 60. Electrodes 62 are located in thin-film transistor layer 108 on substrate 96, so the electric field that is produced in liquid crystal material 60 is strongest near layer 108 and is weakest near layer 118. Color filter array 116 may be deposited on substrate 118. Layer 118 may be formed from clear glass, clear plastic, or other transparent material.

In the FIG. 16 example, the red pixel "R" and the blue pixel "B" are not receiving signals on their respective electrodes 62, so the liquid crystals 60' in the portions of liquid crystal layer 60 that are associated with the R and B pixels have not been rotated. The electrode 62 that is associated with the green pixel "G" is, however, receiving a signal (in this example) and is therefore producing an electric field in an adjacent portion of layer 60. As a result, liquid crystals 60' above electrode 62 in the green pixel "G" are rotated.

When viewing the pixels of display 14 "on-axis" (i.e., along a direction that is parallel to the surface normal n for substrate 118), backlight 66 will generally not leak appreciably into adjacent pixels and the pixel colors will tend not to bleed into each other. When, however, viewer 76 views display 14 along an off-axis angle such as the angle associated with direction 78 of FIG. 16, there is a risk that the viewer will view part of the liquid crystal material associated with one pixel through the color filter of another pixel. If not well controlled, this effect can reduce display performance by reducing color accuracy.

With a display of the type show in FIG. 16, off-axis performance may be enhanced, because off-axis light rays that have the potential to cause interference are blocked by black matrix material 124 that is formed on the inner surface of color filter array 116. When viewer 76 views display 14 along viewing axis 78, viewer 76 will observe black matrix structures 124 blocking rotated liquid crystals 60' associated with green pixel "G". In other words, light 66 that has travelled through rotated (i.e., "on") liquid crystals 60' toward red ("R") color filter element 116' is blocked by black matrix material 124.

A viewer observing the center of the green pixel "on-axis" will therefore correctly observe that the green pixel is emitting green filtered backlight 66 and has a green color. When viewer 76 views display 14 along viewing axis 78, however, viewer 76 will only observe black matrix 124. The red pixel "R" in FIG. 16 will therefore correctly appear "off" (e.g., the red pixel's liquid crystals 60' have not been rotated, so the viewer should not be observing any red light through the red color filter element 116').

The enhanced blocking for display 14 of color bleeding between adjacent pixels may be exploited to enhance color accuracy and/or to reduce the width of black matrix 124 and thereby improve display brightness efficiency.

The example of FIG. 16 is merely illustrative. If desired, color filter array 116 may be formed on thin-film transistor layer 108. If desired, a color filter array 116 that is formed on thin-film transistor layer 108 may include a black matrix 124 over an interior surface of at least a portion of color filter layer. If desired, a color filter layer 116 and/or a black matrix 124 may be formed on both layer 108 and layer 118. In configurations in which a color filter layer 116 is formed on both layer 108 and layer 118, the thickness of each color filter layer may be equal, the thickness of the color filter layer on layer 118 may be larger than the thickness of the color filter layer on layer 108, or the thickness of the color filter layer on layer 118 may be smaller than the thickness of the color filter layer on layer 108.

Figure 17:
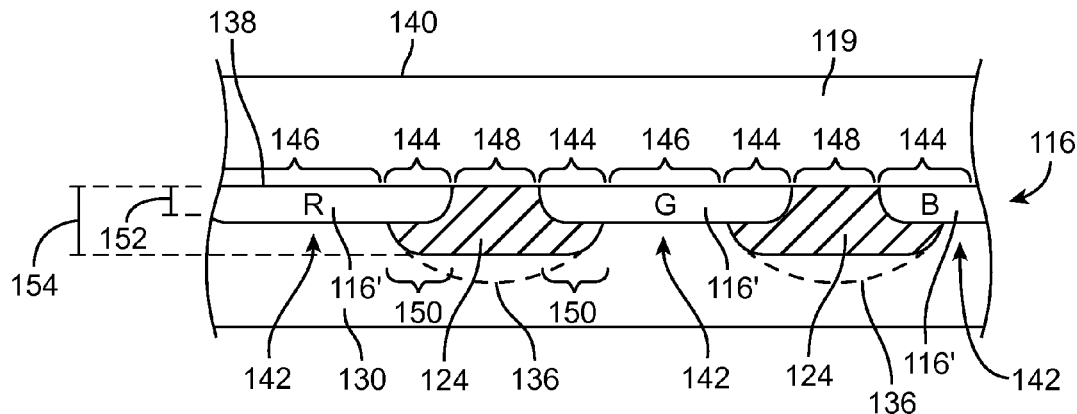
FIG. 17 is a cross-sectional side view of a portion of a color filter array showing how a portion of an array of color filter elements may be interposed between a region of a black matrix and an inner surface of a transparent substrate in accordance with an embodiment of the present invention.
Figure 18:
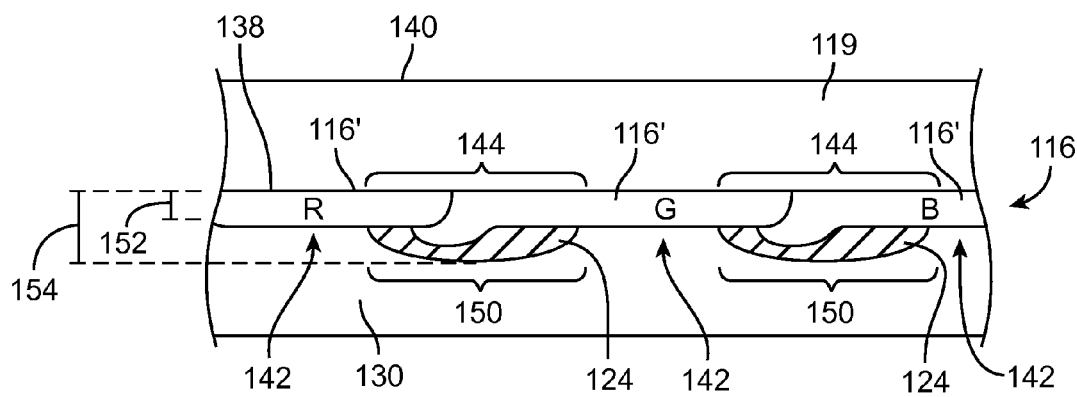
FIG. 18 is a cross-sectional side view of a portion of a color filter array showing how a portion of an array of color filter elements may be interposed between substantially all of a black matrix and an inner surface of a transparent substrate in accordance with an embodiment of the present invention.
Figure 19:
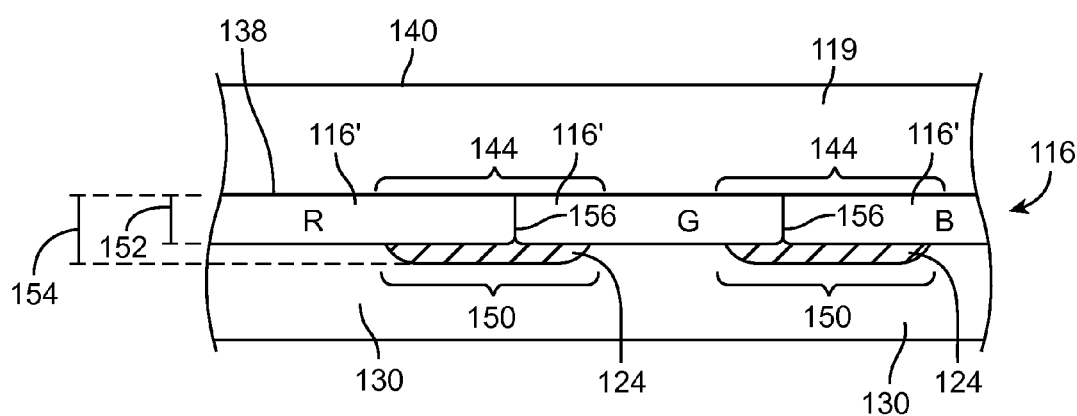
FIG. 19 is a cross-sectional side view of a portion of a color filter array showing how color filter elements may have adjoining edges and a black matrix may cover the adjoining edges in accordance with an embodiment of the present invention.

As shown in FIGS. 17, 18, and 19, black matrix material 124 may be an organic opaque polymer that is formed over at least a portion of color filter elements 116'. In the examples of FIGS. 17, 18, and 19, color filter elements 116' are formed on a transparent substrate layer 119. Transparent substrate layer 119 may be formed from clear glass, plastic, or any other suitable transparent substrate. Transparent substrate layer 119 may be, as examples, an outer display layer such as layer 118 or an inner display layer such as combined layers 96 and 108 of FIG. 16.

As shown in the example of FIG. 17, individual color filter elements 116' that have a lateral separation from each other may be formed on layer 119. Layer 119 may have an inner surface 138 and an outer surface 140. Inner surface 138 may, for example, be a surface of layer 119 that is closer to a liquid crystal layer such as liquid crystal layer 60 (see, e.g., FIG. 16) than outer surface 140. Black matrix material 124 may be partially formed on color filter elements 116' and partially formed on inner surface 138.

Regions such as regions 148 of black matrix material 124 may be formed directly on inner surface 138 of layer 119 without any interposed color filter elements. Regions 150 of black matrix material 124 may be formed on portions 144 of array 116 of color filter elements 116' that are interposed between black matrix 124 and inner surface 138 of layer 119.

Black matrix 124 may include openings such as openings 142. Color filter elements 116' may be formed in openings 142 so that portions 146 of color filter elements 116' may pass light of a corresponding color. Color filter elements 116' may be characterized by a first thickness 152 on inner surface 138. Black matrix layer 124 may be characterized by a second thickness 154 on inner surface 138 that is greater than thickness 152. However, this is merely illustrative. If desired, thickness 154 may be substantially the same as thickness 152 or may be smaller than thickness 152.

A planarization layer such as layer 130 may be formed over some or all of opaque masking layer 124 and color filter elements 116'. Planarization layer 130 may be formed from a layer of silicon oxide, silicon nitride, silicon oxynitride, an organic material such as acrylic, other transparent planarizing materials, or a combination of two or more of these materials. Layer 130 may be deposited by screen printing, spin-on coating, spray coating, physical vapor deposition, chemical vapor deposition, or other suitable deposition techniques. If desired, layer 130 may be polished to help planarize layer 130.

If desired, black matrix 124 may include protruding portions (indicated by dashed lines 136) that extend beyond color filter elements 116' to form extended barriers to light an off-axis viewing angles. Protruding portions 136 may be rounded, may be triangular, may be rectangular, may have faceted edges, or may have any other suitable shape for blocking off-axis light.

During manufacturing of device 10, a first set of color filter elements 116' (e.g., green color filter elements 116') may be formed on layer 119 by, for example, providing a coating of a first color photoresist (e.g., a photoresist material that is configured to pass green light) on inner surface 138, providing a patterned ultraviolet (UV) light mask on the color photoresist material, etching the color photoresist material using UV light, and removing the UV mask.

A subsequent set of color filter elements 116' (e.g., red color filter elements 116') may then be formed on layer 119 by, for example, providing a second coating of a color photoresist (e.g., a photoresist material that is configured to pass red light) on inner surface 138 and remaining portions of the first color photoresist material, providing a second patterned UV mask on the second color photoresist material, etching the second color photoresist material using UV light, and removing the UV mask. Additional sets of color filter elements 116' (e.g., blue color filter elements, or other color filter elements) may then be formed on substrate layer 119 by repeating the steps of providing a color photoresist, providing a UV mask, etching the color photoresist, and removing the UV mask.

Black matrix 124 may then be formed over portions 144 of color filter layer 116 and on portions of inner surface 138 by providing a coating of black matrix material over color filter elements 116' and on exposed portions of inner surface 138 of layer 119, providing a patterned UV mask on the coating of black matrix material 124, etching openings 142 into black matrix material 124 and removing the UV mask.

Other steps may be involved in forming color filter elements 116' and black matrix 124 such as baking steps (e.g., soft baking and hard baking), deposition steps (e.g., screen printing, spin-on coating, spray coating, physical vapor deposition, and chemical vapor deposition) or other suitable steps. The steps described in connection with FIG. 17 are merely illustrative.

The example of FIG. 17 in which color filter elements 116' of color filter array 116 are spatially separated and black matrix material 124 is formed in contact with inner surface 138 is merely illustrative. As shown in the example of FIG.

18, individual color filter elements 116' may be formed on layer 119 so that each individual color filter element 116' partially overlaps a portion of an adjacent color filter element 116' of a different color. Black matrix material 124 may be formed over color filter elements 116' so that a portion of black matrix material 124 is formed over overlapping portions of color filter elements 116'.

In the example of FIG. 18, portion 144 of color filter array 116 that is covered by black matrix 124 may include overlapping portions of color filter elements 116' while portion 150 of black matrix 124 that is formed on color filter elements 116' may include substantially all of black matrix 124 (i.e., black matrix 124 may be formed on color filter elements 116' without touching inner surface 138 of layer 119).

As with the example of FIG. 17, in the example of FIG. 18, planarization layer 130 is formed over opaque masking layer 124 and color filter elements 116'.

During manufacturing of device 10, a first set of color filter elements 116' (e.g., red color filter elements 116') may be formed on layer 119 by, for example, providing a coating of a first color photoresist (e.g., a photoresist material that is configured to pass red light) on inner surface 138, providing a patterned ultraviolet (UV) light mask on the color photoresist material, etching the color photoresist material using UV light, and removing the UV mask.

A subsequent set of color filter elements 116' (e.g., green color filter elements 116') may then be formed on layer 119 by, for example, providing a second coating of a color photoresist (e.g., a photoresist material that is configured to pass green light) on inner surface 138 and remaining portions of the first color photoresist material, providing a second patterned UV mask on the second color photoresist material, etching the second color photoresist material using UV light so that a portion of the second color photoresist material remains on a portion of the first color photoresist material, and removing the UV mask.

Additional sets of color filter elements 116' (e.g., blue color filter elements, or other color filter elements) may then be formed on substrate layer 119 by repeating the steps of providing a color photoresist, providing a UV mask, etching the color photoresist, and removing the UV mask.

Black matrix 124 may then be formed over portions 144 of color filter layer 116 by providing a coating of black matrix material 124 over color filter elements 116', providing a patterned UV mask on the coating of black matrix material 124, etching openings 142 into black matrix material 124, and removing the UV mask.

Other steps may be involved in forming color filter elements 116' and black matrix 124 such as baking steps (e.g., soft baking and hard baking), deposition steps (e.g., screen printing, spin-on coating, spray coating, physical vapor deposition, and chemical vapor deposition) or other suitable deposition steps. The steps described in connection with FIG. 18 are merely illustrative.

The example of FIG. 18 in which color filter elements 116' of color filter array 116 are partially overlapping is merely illustrative. As shown in FIG. 19, array 116 of color filter elements 116' may form a contiguous array of color filter elements 116' of different colors having adjoining edges 156. Black matrix 124 may be configured to cover adjoining edges 156. Color filter elements 116' having adjoining edges 156 may be interposed between substantially all of black matrix 124 and inner surface 138 of layer 119 (i.e., region 150 of black matrix 124 may include substantially all of black matrix 124 so that black matrix 124 is formed on color filter array 116 and without touching inner surface 138 of layer 119).

The examples of FIGS. 17, 18, and 19 in which black matrix material 124 is formed from an organic opaque polymer that is formed over at least a portion of color filter elements 116' and covered by planarization layer 130 are merely illustrative. If desired, planarization layer 130 may be interposed between black matrix 124 and color filter elements 116' as shown in FIGS. 20 and 21.

In configurations in which planarization layer 130 is interposed between black matrix 124 and color filter elements 116', black matrix 124 may be formed from thin patterned inorganic material such as a layer of patterned metal (e.g., chrome) or other inorganic material. A black matrix 124 that is formed from a thin patterned metal layer may have a thickness T. Thickness T may be (as examples) between 1-25 microns, 1-10 microns, less than 10 microns, less than 5 microns, less than 3 microns, less than 2 microns, or less than 1 micron.

Figure 20:
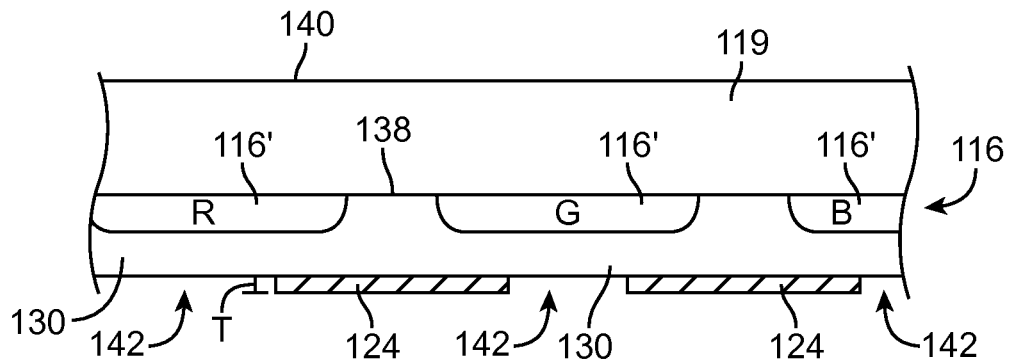
FIG. 20 is a cross-sectional side view of a portion of a color filter array showing how a planarization layer may be interposed between a portion of an array of spatially-separated color filter elements and a black matrix formed from a thin metal matrix in accordance with an embodiment of the present invention.
Figure 21:
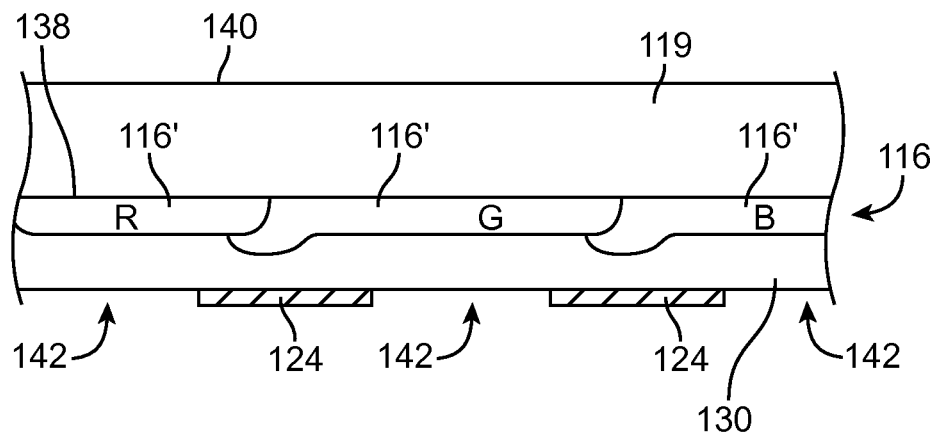
FIG. 21 is a cross-sectional side view of a portion of a color filter array showing how a planarization layer may be interposed between a portion of an array of partially overlapping color filter elements and a black matrix formed from a thin metal matrix in accordance with an embodiment of the present invention.

As shown in FIG. 20, individual color filter elements 116' that are formed on layer 119 may have a lateral separation from each other. Planarization layer 130 may be formed on color filter elements 116' and on portions of inner surface 138 in gaps between color filter elements 116' (i.e., some of planarization layer 130 may be interposed between color filter elements 116' in array 116 of color filter elements). Black matrix material 124 may be formed on planarization layer 130 over gaps between color filter elements 116'. Openings 142 in black matrix 124 may be aligned with color filter elements 116' so that color filter elements 116' that are formed in openings 142 may pass light of a corresponding color.

If desired, some of color filter elements 116' formed on layer 119 may have a portion that partially overlaps a portion of an adjacent color filter element 116' of a different color. Planarization layer 130 may be formed over color filter elements 116' so that raised overlapping portions of color filter array 116 may be covered by a planar layer. Black matrix material 124 may be formed on planarization layer over color filter elements 116' so that a portion of black matrix material 124 is formed on planarization layer 130 over overlapping portions of color filter elements 116'.

During manufacturing of display 14, color filter elements 116' of FIGS. 20 and 21 may be formed using some or all of the illustrative steps described above in connection with FIGS. 17 and 18, respectively. Planarization layer 130 may then be deposited over color filter elements 116'. Black matrix 124 may then be formed on planarization layer 130 by providing a coating of black matrix material 124 on planarization layer 130, providing a patterned UV mask on the coating of black matrix material 124, etching openings 142 into black matrix material 124 and removing the UV mask.

The examples of FIGS. 20 and 21 in which planarization layer 130 is interposed between color filter array 116 and a patterned metal black matrix 124 is merely illustrative. As shown in FIG. 21, a patterned metal black matrix 124 may be formed directly on color filter elements 116' so that patterned metal black matrix 124 covers adjoining edges 156 of adjacent color filter elements 116' and color filter elements 116' are interposed between substantially all of black matrix 124 and inner surface 138 of layer 119.

Figure 22:
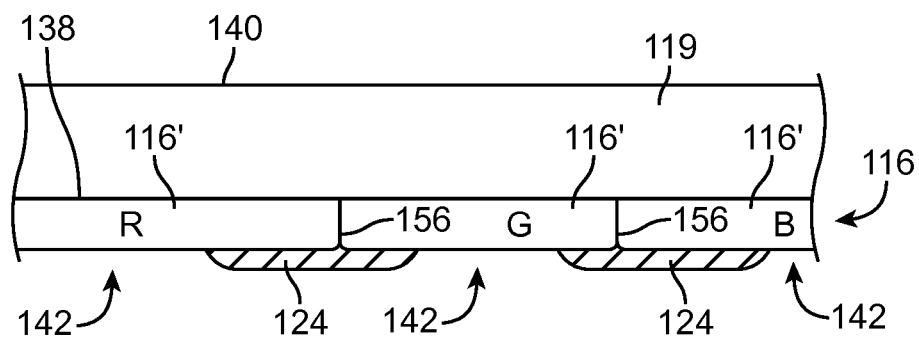
FIG. 22 is a cross-sectional side view of a portion of a color filter array showing how color filter elements may have adjoining edges and a black matrix formed from a thin metal matrix may cover the adjoining edges in accordance with an embodiment of the present invention.

During manufacturing of display 14, color filter elements 116' of FIG. 22 may be formed using some or all of the illustrative steps described above in connection with FIGS. 17 and/or 18. Black matrix 124 may then be formed on color filter elements 116' by providing a coating of black matrix material 124 over color filter elements 116', providing a patterned UV mask on the coating of black matrix material 124, etching openings 142 into black matrix material 124 and removing the UV mask.

Black matrix 124 and color filter layer 116 may be formed on outer display layer 118 (see, e.g., FIG. 16) in any of the configurations described above in connection with FIG. 17, 18, 19, 20, 21, or 22, or in any combination of those configurations.

Figure 23:
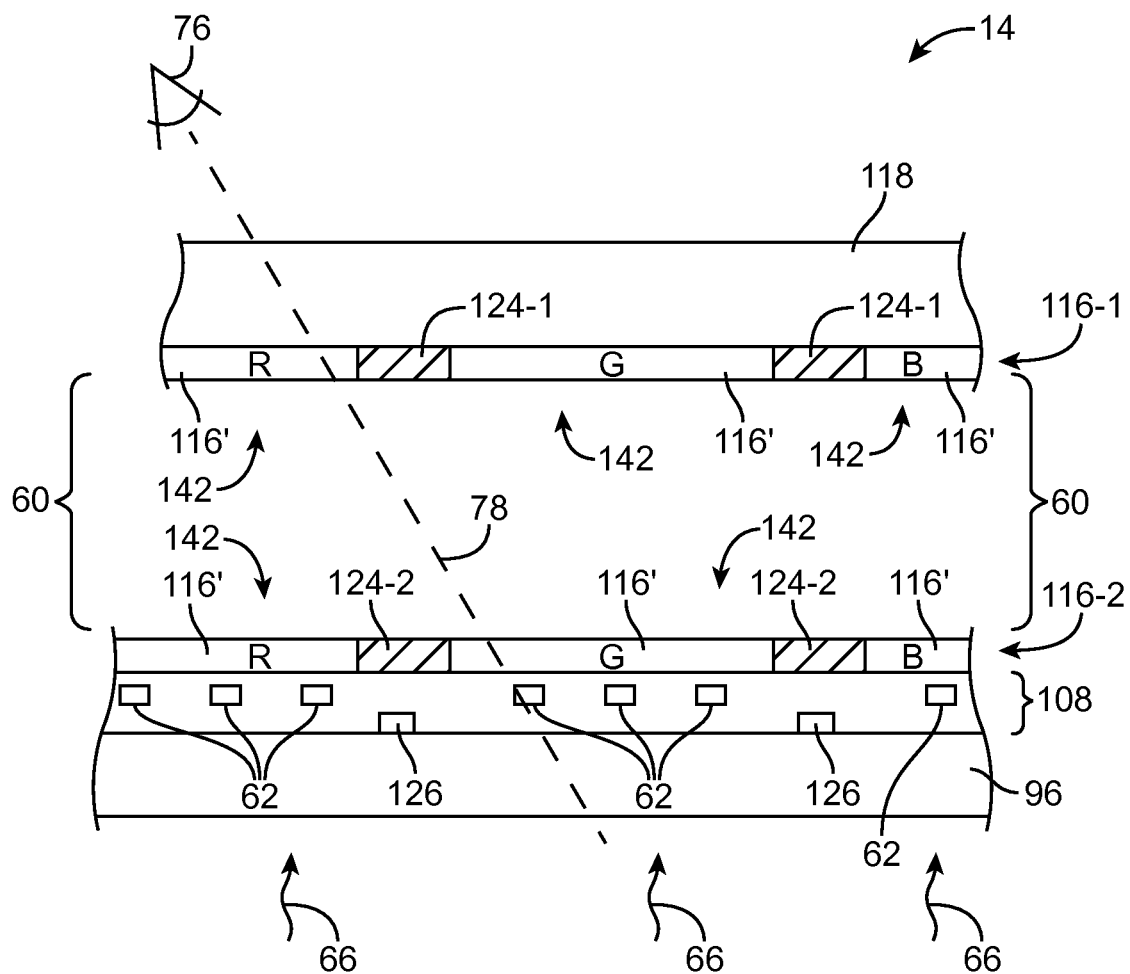
FIG. 23 is a cross-sectional side view of a portion of an illustrative display showing how a first color filter array and black matrix may be formed on a first transparent display substrate and a second color filter array and black matrix may be formed on a second transparent display substrate in accordance with an embodiment of the present invention.

As shown in FIG. 23, display 14 may be provided with multiple color filter layers. Color filter layers such as color filter layers 116-1 and 116-2 may be formed on opposing sides of liquid crystal layer 60. Color filter layers 116-1 and 116-2 may, if desired, each be provided with black matrix material 124.

Black matrices 124-1 and 124-2 may be formed on color filter layers 116-1 and 116-2 respectively in any of the configurations described above in connection with FIG. 17, 18, 19, 20, 21, or 22, or in any combination of those configurations.

In the example of FIG. 23, color filter layer 116-1 is formed on transparent substrate layer 118 and color filter layer 116-2 is formed over layer 108 on transparent substrate layer 96. In this way, backlight 66 may pass through both layers 116-1 and 116-2 as backlight 66 passes through display 14.

Viewer 76 may view display 14 through substrate 118 and color filter layers 116-1 and 116-2 by viewing in a direction such as direction 78. (Polarizer layers, cover glass, backlight structures and other layers have been omitted from FIG. 23 for clarity). In configurations in which color filter elements 116' are formed on both the inner display layer (e.g., thin-film transistor layer 108 and transparent substrate layer 96) and the outer display layer (e.g., transparent substrate layer 118), black matrix 124-1 may include openings 142 for color filter elements 116' of array 116-1 and black matrix 124-2 may have openings 142 for color filter elements 116' of array 116-2.

Figure 24:
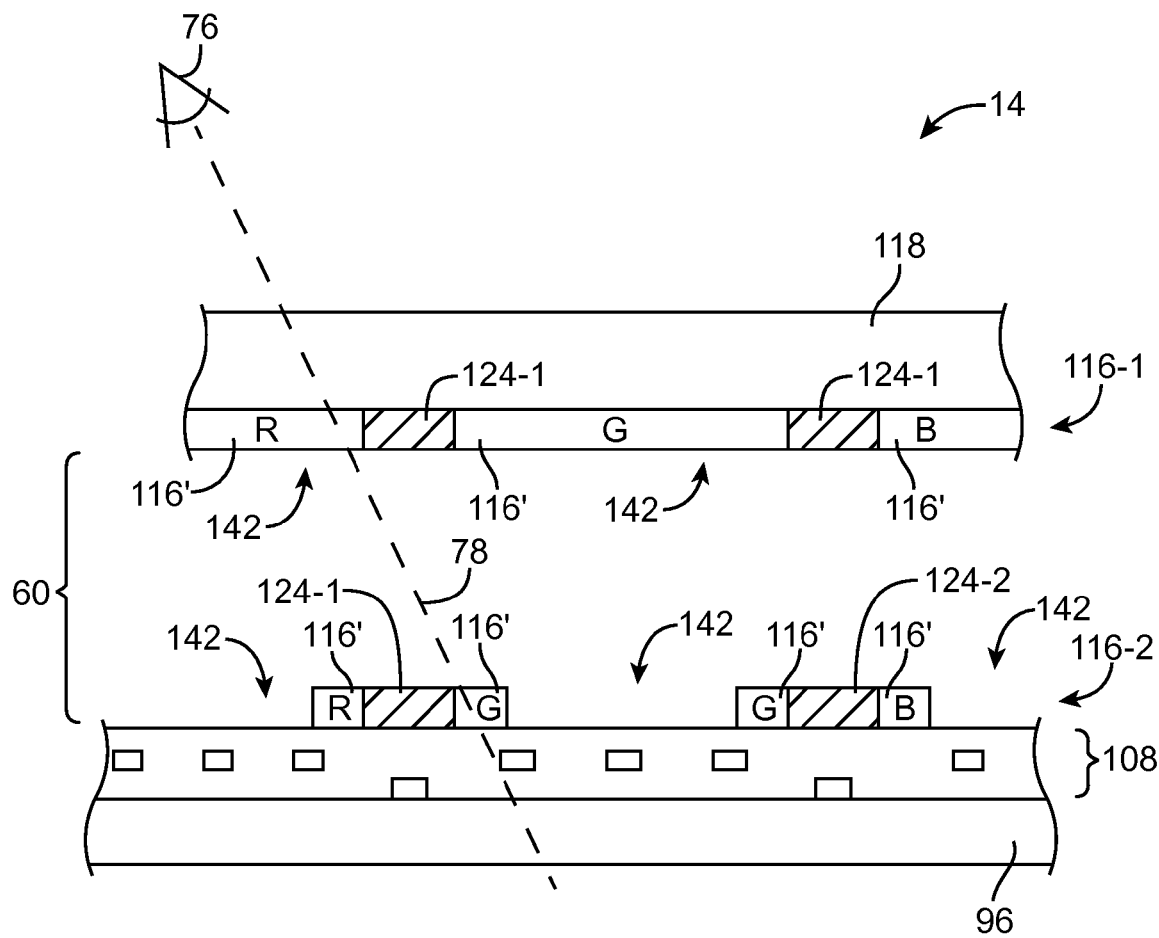
FIG. 24 is a cross-sectional side view of a portion of an illustrative display showing how color filter elements may partially fill openings in a black matrix formed on an inner display layer in accordance with an embodiment of the present invention.
Figure 25:
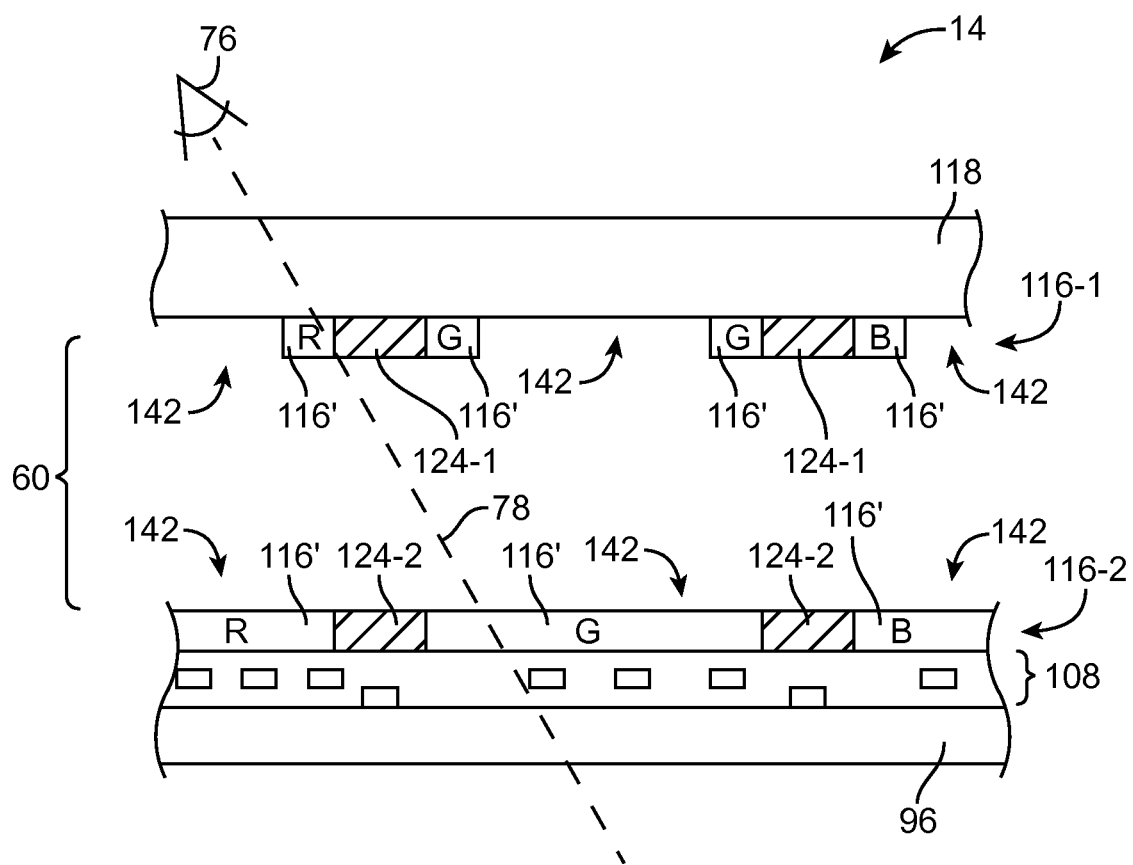
FIG. 25 is a cross-sectional side view of an illustrative display showing how color filter elements may partially fill openings in a black matrix formed on an outer display layer in accordance with an embodiment of the present invention.

In the example of FIG. 23, openings 142 in both black matrix 124-1 and black matrix 124-2 are completely filled with color filter elements 116' of array 116-1 and 116-2 respectively. However, this is merely illustrative. As shown in FIG. 24, if desired, openings 142 of black matrix 124-1 on array 116-1 may be completely filled with color filter elements 116' of array 116-1 and black matrix openings 142 of black matrix 124-2 may be partially filled with color filter elements 116' of array 116-2. Each color filter element 116' of array 116-2 may have a central opening within one of openings 142. As shown in FIG. 25, if desired, openings 142 of black matrix 124-1 on array 116-1 may be partially filled with color filter elements 116' of array 116-1 and black matrix openings 142 of black matrix 124-2 may be completely filled with color filter elements 116' of array 116-2. Each color filter element 116' of array 116-1 may have a central opening within one of openings 142.

Figure 26:
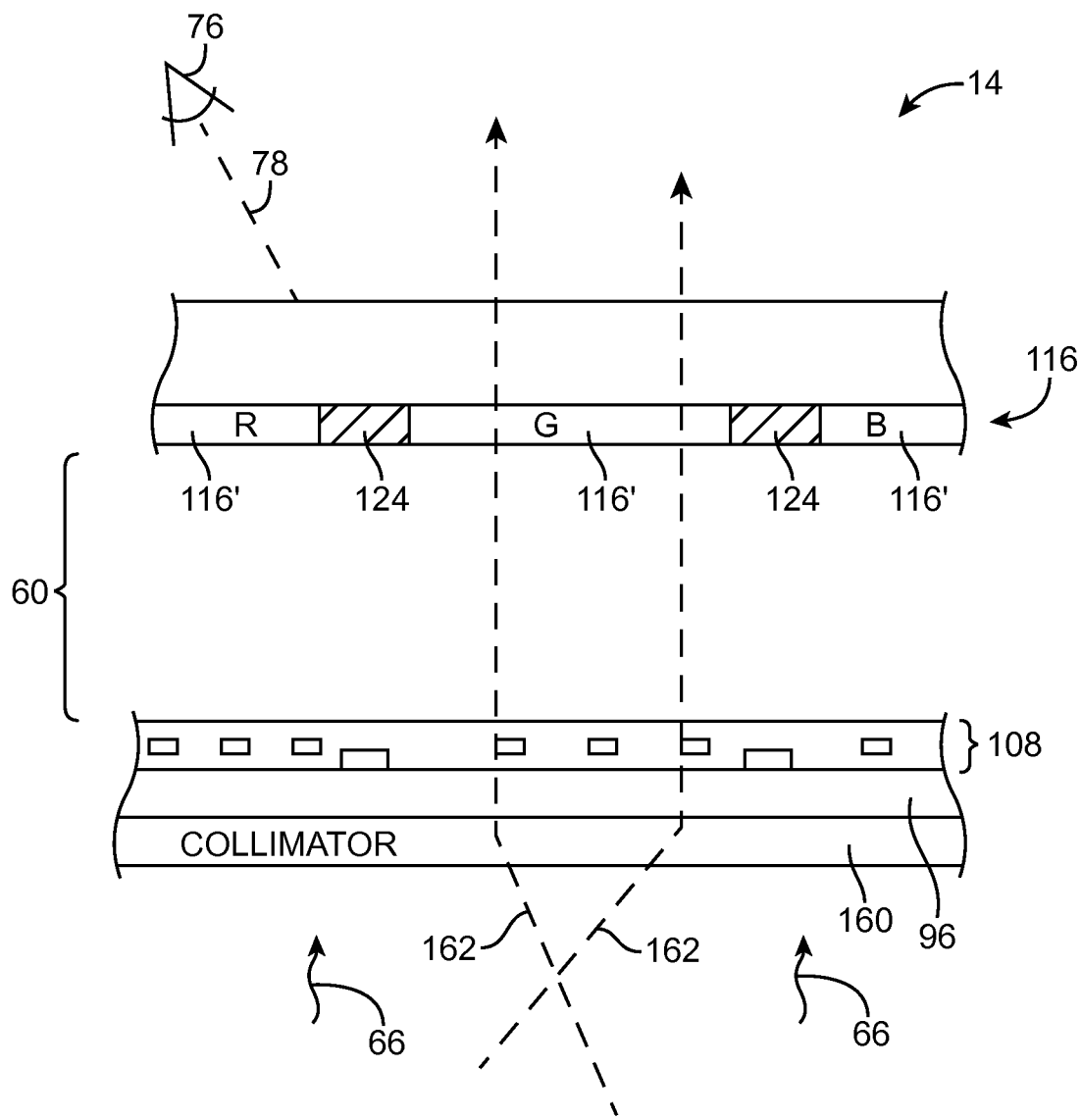
FIG. 26 is a cross-sectional side view of a portion of an illustrative display showing how a collimating layer may be provided on an inner display layer that redirects light through color filter elements formed on an outer display layer in accordance with an embodiment of the present invention.

As shown in FIG. 26, display 14 may be provided with a single color filter array 116 on substrate 118 and a light collimating layer such as collimator 160 on transparent substrate 96. Substrate 96 may have opposing first and second surfaces 97 and 95. Thin-film transistor layer 108 may be formed on first surface 97 of substrate 96. Light collimating layer 160 may be formed on opposing second surface 95 of substrate 96. In this way, display 14 may be configured to redirect backlight 66 that is emitted in an off-axis direction such as one of directions 162 onto an on-axis path so that light that passes through liquid crystal layer 60 forms a collimated beam of light with minimal off-axis components.

Collimating layer 160 may be formed from, as examples, collimating layer such as Fresnel lens structures, micro-lens structures, or structures containing an array of micro-prisms that generates multiple internal reflections of light that is received from off-axis directions and re-transmits that light after an internal reflection into an on-axis direction.

Figure 27:
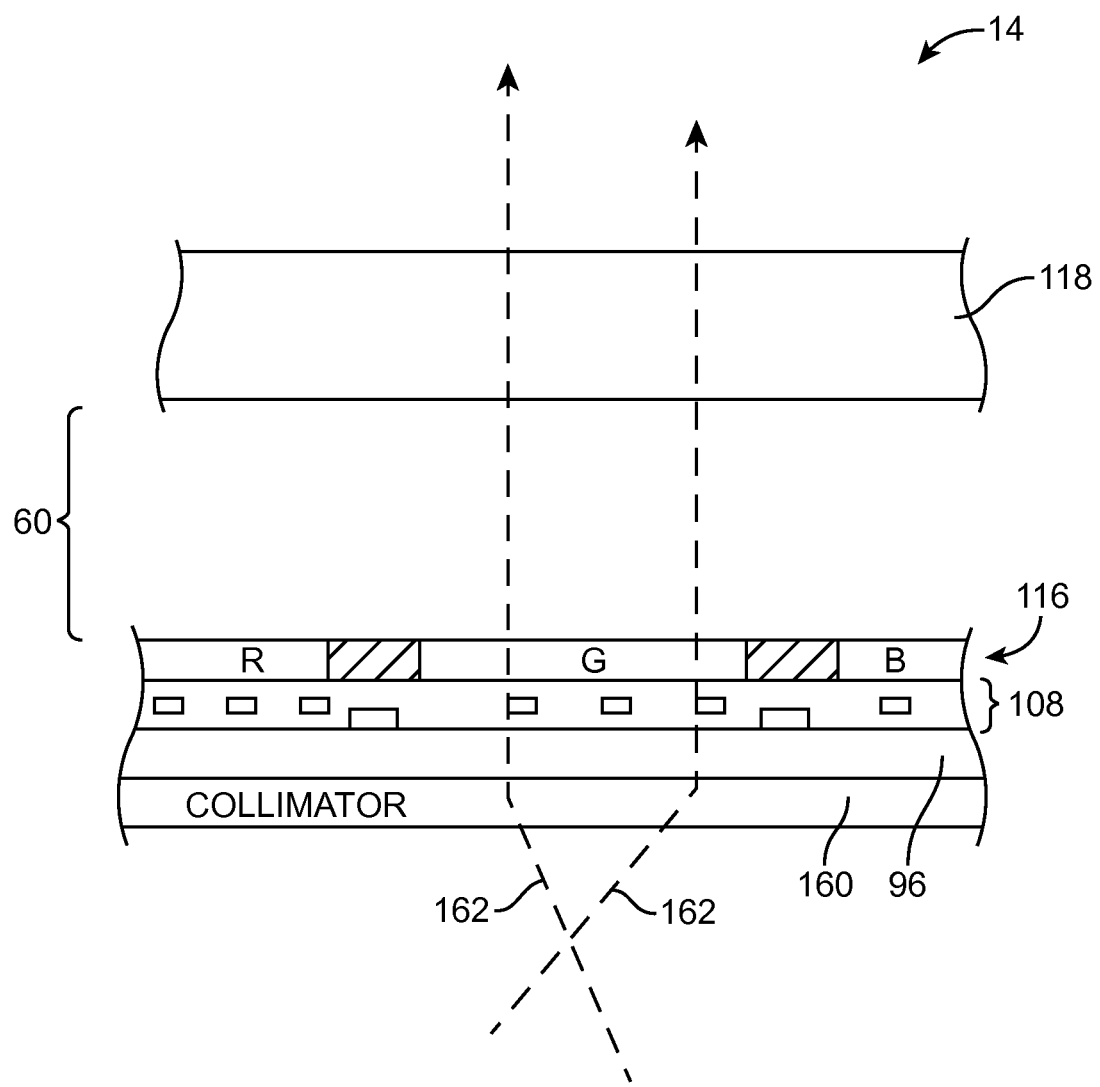
FIG. 27 is a cross-sectional side view of an illustrative display showing how a collimating layer may be provided on an inner display layer that redirects light through color filter elements formed on an opposing surface of the inner display layer in accordance with an embodiment of the present invention.

The arrangement of FIG. 26 is merely illustrative. In configurations in which display 14 is provided with a collimating layer such as collimating layer 160 on substrate 96, color filter array 116 may, if desired, be formed on thin-film transistor layer 108 as shown in FIG. 27.

If desired, color filter elements 116' of color filter arrays 116 (including arrays 116-1 and 116-2 of FIGS. 23, 24, and 25) may each be formed from a common color filter material or, if desired, some of color filter elements 116' may be formed from one or more different color filter materials. As an example, color filter array 116-2 on thin-film transistor layer 108 may include one or more color filter elements 116C that are formed from a different material than the material used to form color filter elements 116' as shown in FIG. 28.

Figure 28:
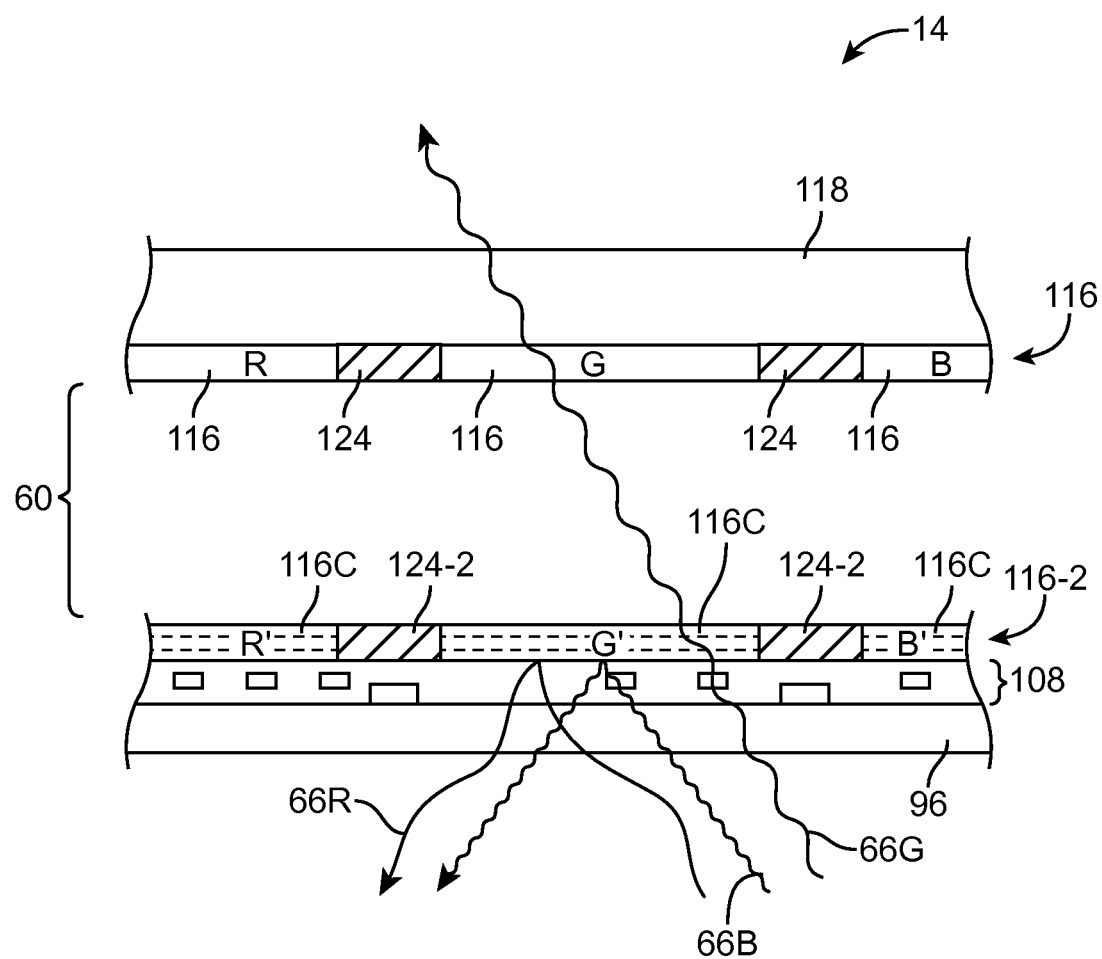
FIG. 28 is a cross-sectional side view of an illustrative display showing how some color filter elements may be configured to reflect selected colors of light in accordance with an embodiment of the present invention.

In the example of FIG. 28, color filter elements 116C may be formed from a multilayer dielectric stack that includes materials with different indices of refraction configured to form an optical filter that selectively reflects some colors of light while reflecting other colors of light. Color filter elements 116C may, for example, be cholesteric color filter elements formed from chiral nematic materials or other wavelength-dependent reflective materials that are configured to reflect selected colors of light. As shown in FIG. 28 as an illustrative example, green "G'" color filter element 116C may reflect red light 66R and blue light 66G and to pass green light 66G. Similarly, red "R'" color filter element 116C may be configured to reflect green light and blue light while passing red light and blue "B'" color filter element 116C may be configured to reflect green light and red light while passing blue light.

Figure 29:
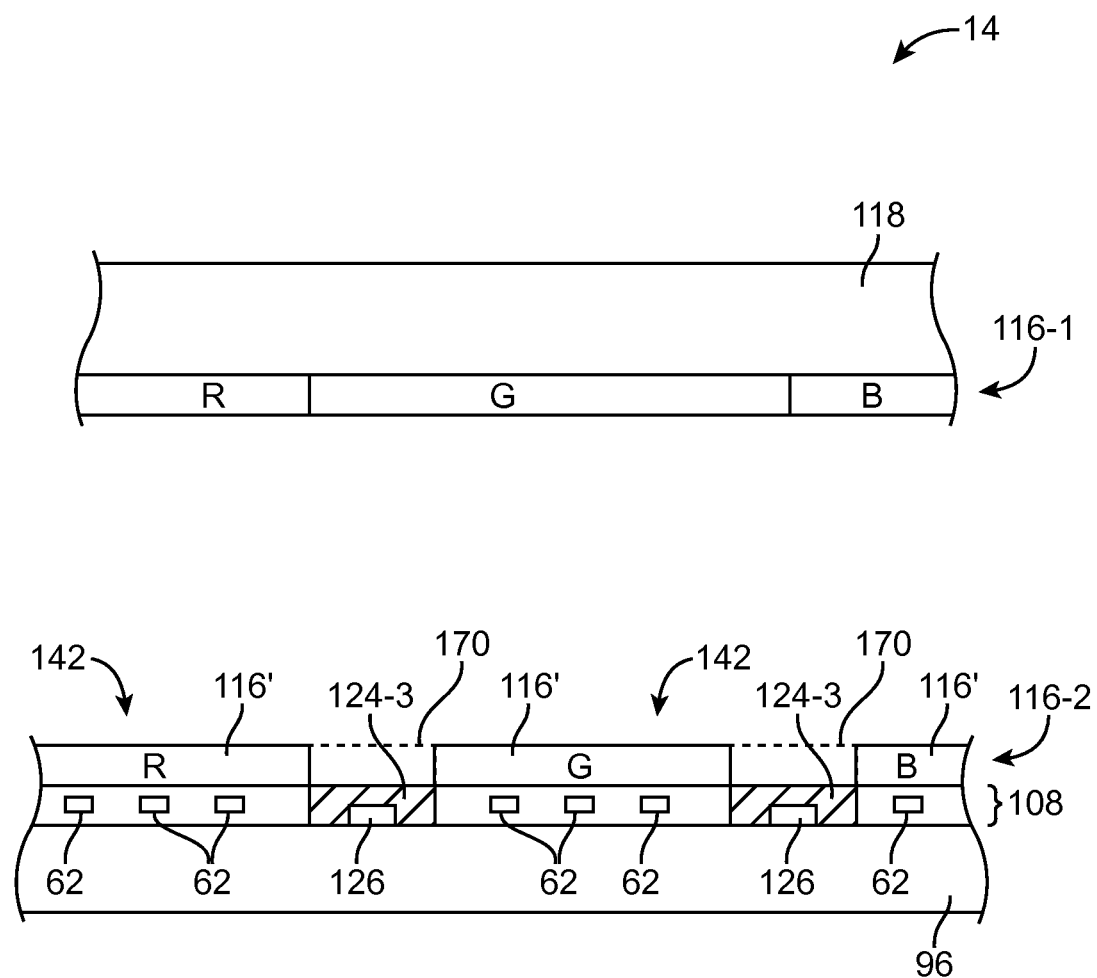
FIG. 29 is a cross-sectional side view of an illustrative display showing how a first color filter array may be formed on a first transparent display substrate and a second color filter array and black matrix may be formed on a thin-film transistor layer having control lines that are immersed in the black matrix in accordance with an embodiment of the present invention.

As shown in FIG. 29, a color filter layer such as color filter array 116-1 on substrate 118 may be formed free of black matrix material. In configurations in which color filter array 116-1 on substrate 118 is formed free from black matrix material, at least some of interconnect lines 126 may be embedded within black matrix 124-3 that is part of a color filter layer such as color filter array 116-2 on thin-film transistor layer 108. Black matrix 124-3 may include openings 142 for the color filter elements 116' of array 116-2. If desired, black matrix 124-3 may have an inner surface that is coplanar with color filter elements 116' of array 116-2 (as indicated by dashed lines 170) or black matrix 124-2 may have an inner surface that is formed in a different plane from color filter elements 116' of array 116-2.

Black matrices 124 and color filter layers 116 of FIGS. 24, 25, 26, 27, 28 and 29 may be formed having any of the configurations described above in connection with FIG. 17, 18, 19, 20, 21, or 22, or in any combination of those configurations.

The foregoing is merely illustrative of the principles of this invention and various modifications can be made by those skilled in the art without departing from the scope and spirit of the invention.

What is claimed is:

1. A display, comprising:
a first transparent substrate layer;
a second transparent substrate layer;
a layer of liquid crystal material formed between the first and second transparent substrate layers;
a first color filter layer formed on the first transparent substrate layer;
a second color filter layer formed on the second transparent substrate layer, wherein the first color filter layer comprises a first array of color filter elements and a first black matrix having openings for the first color filter elements and wherein the second color filter layer comprises a second array of color filter elements and a second black matrix having openings for the second color filter elements, and wherein the second black matrix openings are completely filled with the color filter elements of the second array and wherein the first black matrix openings are partially filled with the color filter elements of the first array.

2. The display defined in claim 1 wherein the second color filter layer comprises thin-film transistors and electrodes that are configured to produce electric fields to adjust the liquid crystal material.

3. The display defined in claim 2 wherein the first transparent substrate comprises a layer of cover glass.

4. The display defined in claim 1 wherein each of the color filter elements of the first array has a central opening.

5. The display defined in claim 1 wherein the second transparent substrate layer comprises thin-film transistors, interconnect lines, and electrodes that are configured to produce electric fields to adjust the liquid crystal material, and wherein at least some of the interconnect lines are embedded within the second black matrix.

6. The display defined in claim 1 wherein at least some of the second color filter elements comprise a multilayer dielectric stack that includes materials with different indices of refraction configured to form an optical filter.

7. A display, comprising:
a first transparent substrate layer;
a second transparent substrate layer;
a layer of liquid crystal material formed between the first and second transparent substrate layers;
a color filter layer formed on an inner surface of the first transparent substrate layer, wherein the color filter layer comprises an array of colored filter elements and a black matrix having openings for the color filter elements and wherein at least a portion of the array of color filter elements is interposed between the black matrix and the inner surface, wherein the black matrix contacts the inner surface of the first transparent substrate layer, and wherein the black matrix comprises protrusions that extend past the color filter layer and are selected from the group consisting of: rounded protrusions, triangular protrusions, and protrusions with faceted edges.

8. The display defined in claim 7 wherein the black matrix has first regions in which the portion of the color filter elements is interposed between the black matrix and the inner surface and has second regions in which the black matrix is formed on the inner surface without any interposed color filter elements.

9. The display defined in claim 7 wherein the first transparent substrate comprises a layer of cover glass that forms an outermost layer of the display.

* * * * *